United States Patent
Noda

(10) Patent No.: US 9,377,607 B2
(45) Date of Patent: Jun. 28, 2016

(54) ZOOM LENS AND IMAGING APPARATUS

(71) Applicant: FUJIFILM Corporation, Tokyo (JP)

(72) Inventor: Taiga Noda, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 49 days.

(21) Appl. No.: 14/540,362

(22) Filed: Nov. 13, 2014

(65) Prior Publication Data

US 2015/0131163 A1 May 14, 2015

(30) Foreign Application Priority Data

Nov. 13, 2013 (JP) .................................. 2013-234861

(51) Int. Cl.
*G02B 15/177* (2006.01)
(52) U.S. Cl.
CPC .................................... *G02B 15/177* (2013.01)
(58) Field of Classification Search
CPC .................................................... G02B 15/177
See application file for complete search history.

(56) References Cited

U.S. PATENT DOCUMENTS

| 8,085,475 | B2 | 12/2011 | Miyazaki et al. | |
|---|---|---|---|---|
| 8,199,411 | B2 | 6/2012 | Fujimoto | |
| 8,427,758 | B2 | 4/2013 | Yanai et al. | |
| 8,760,771 | B2 | 6/2014 | Sugita | |
| 2015/0131162 | A1* | 5/2015 | Noda | G02B 15/177 359/680 |

FOREIGN PATENT DOCUMENTS

| JP | 2010-176098 | 8/2010 |
|---|---|---|
| JP | 2010-217535 | 9/2010 |
| JP | 2010-249956 | 11/2010 |
| JP | 2012-208378 | 10/2012 |
| JP | 2012-225987 | 11/2012 |

OTHER PUBLICATIONS

DE Search report, dated Jul. 8, 2015; Application No. 10 2014 016 741.0.

* cited by examiner

*Primary Examiner* — David N Spector
(74) *Attorney, Agent, or Firm* — Young & Thompson

(57) ABSTRACT

A zoom lens substantially consists of a negative first lens group, a positive second lens group, a negative third lens group, a positive fourth lens group, and a positive fifth lens group in this order from the object side; wherein
the first lens group through the fourth lens group move along the optical axis while changing magnification from the wide angle end to the telephoto end so as to change the distances among one another such that the distance between the first lens group and the second lens group is reduced and the distance between the second lens group and the third lens group is increased;
the fifth lens group is fixed with respect to an image surface while changing magnification; and
conditional formulas (1) and (2) below are satisfied:

$$0.15 < |f1|/f2 < 1.00 \quad (1)$$

$$0.1 < f4/f5 < 1.1 \quad (2).$$

19 Claims, 12 Drawing Sheets

FIG.2
EXAMPLE 1
WIDE ANGLE END
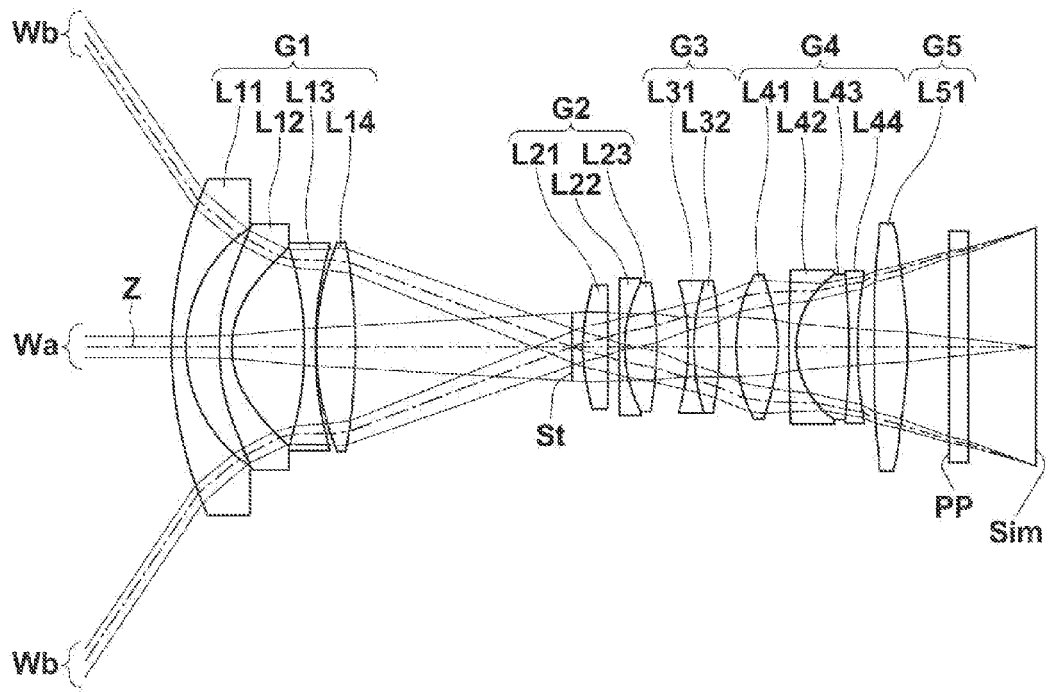
TELEPHOTO END
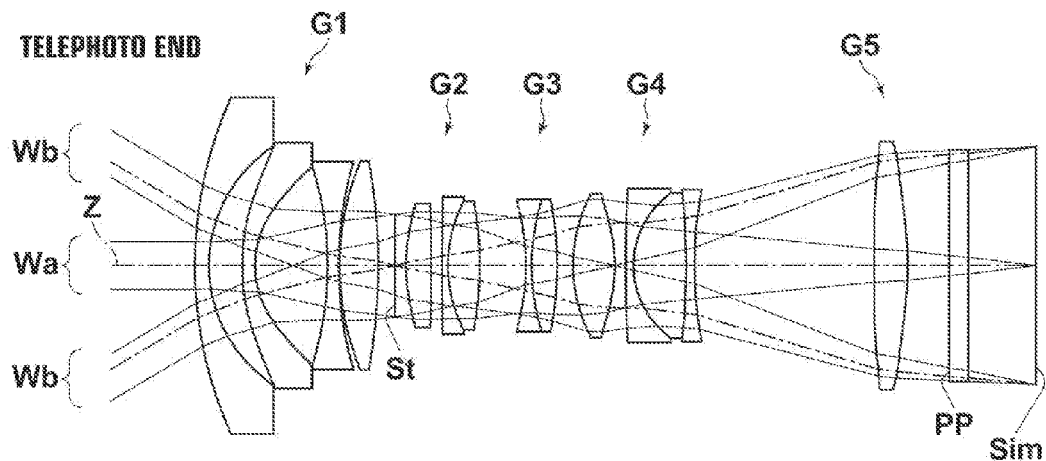

FIG.7
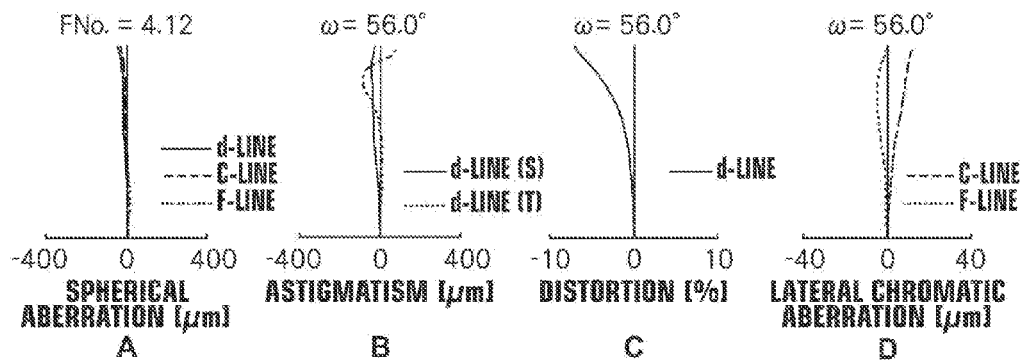
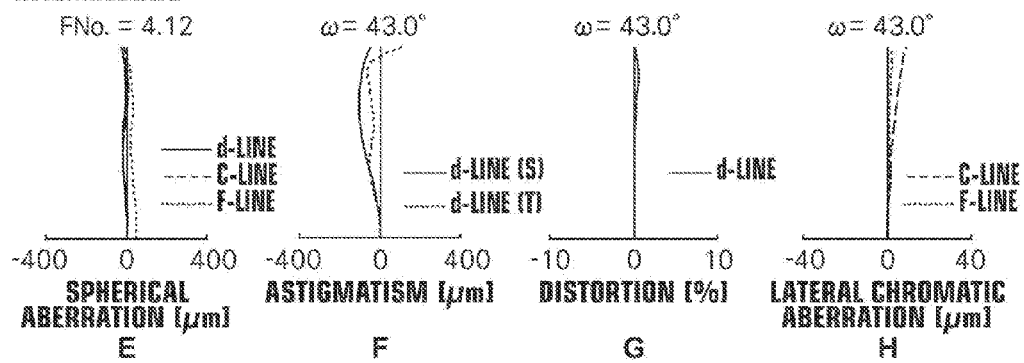
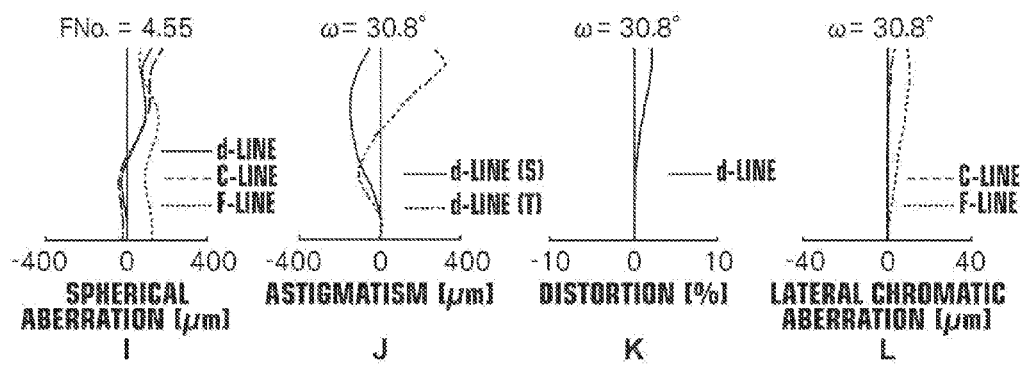

FIG.8
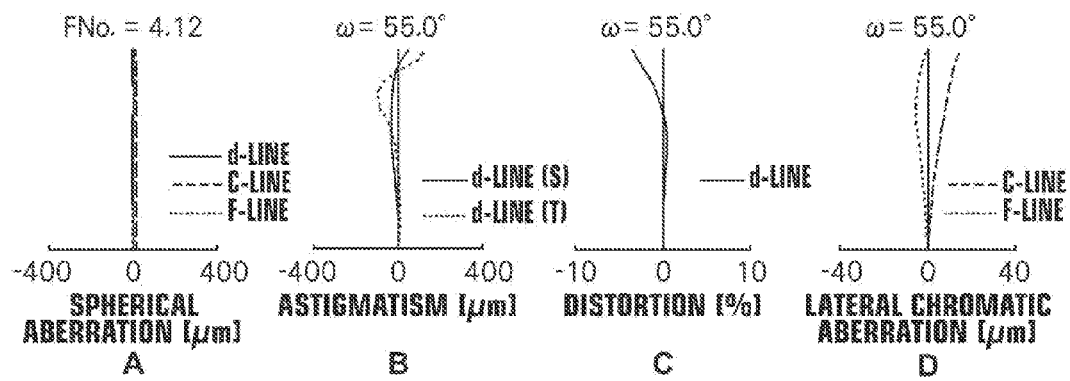
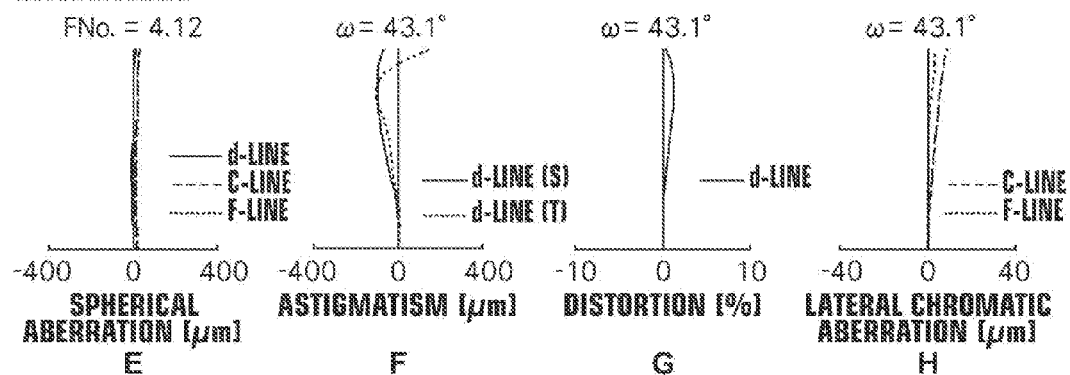
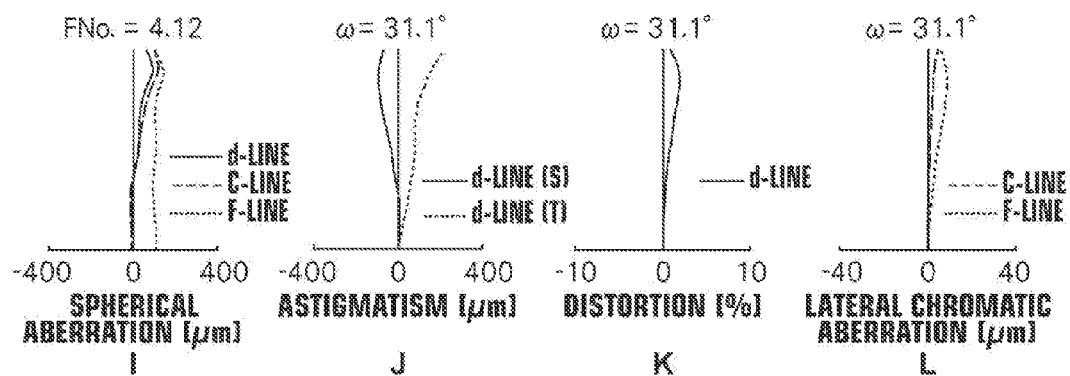

FIG.9
EXAMPLE 3
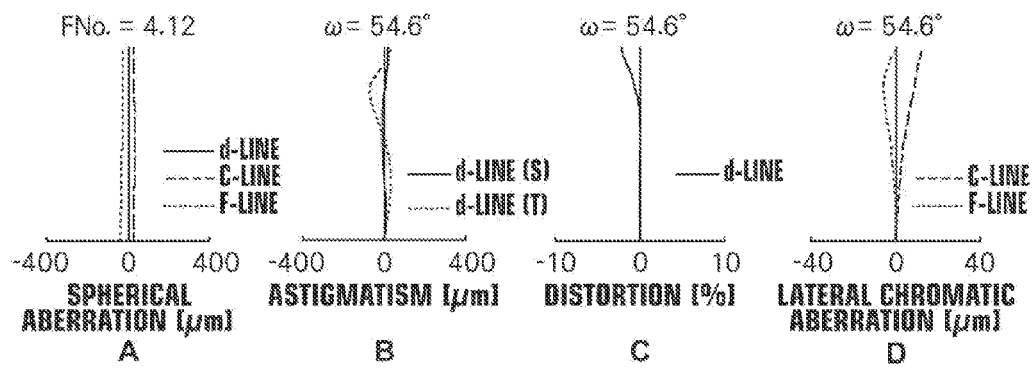
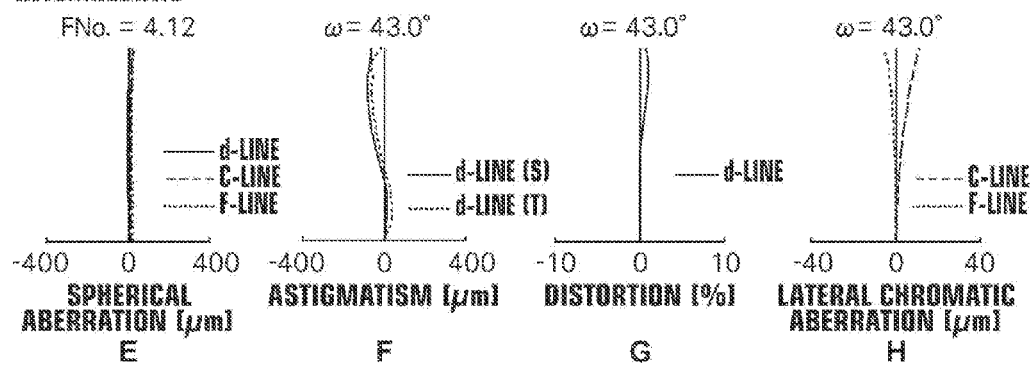
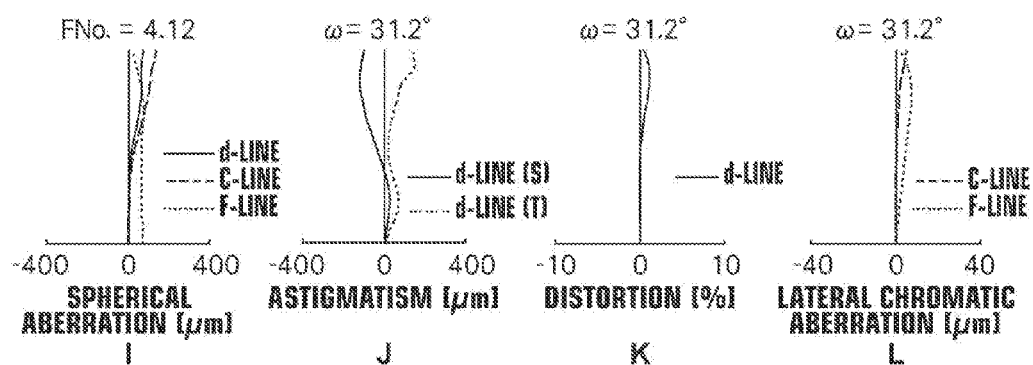

FIG.10
EXAMPLE 4
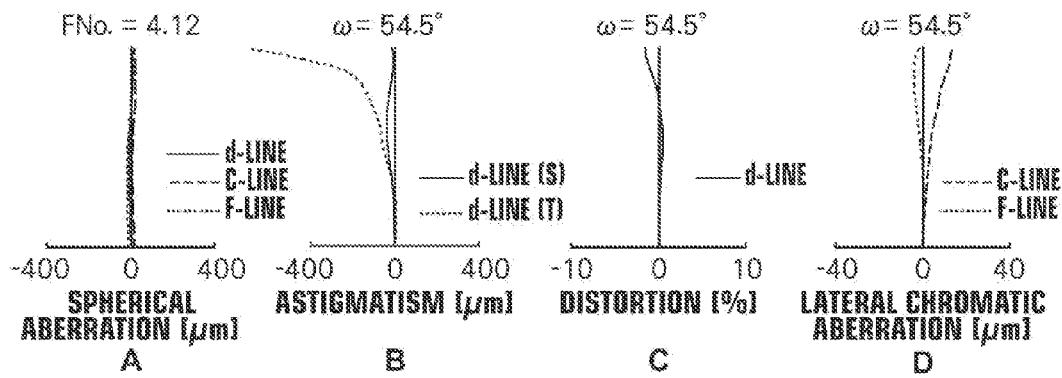
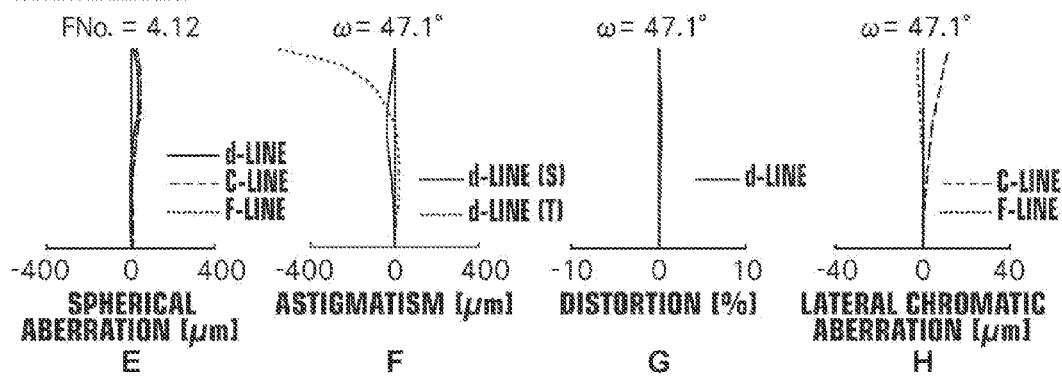
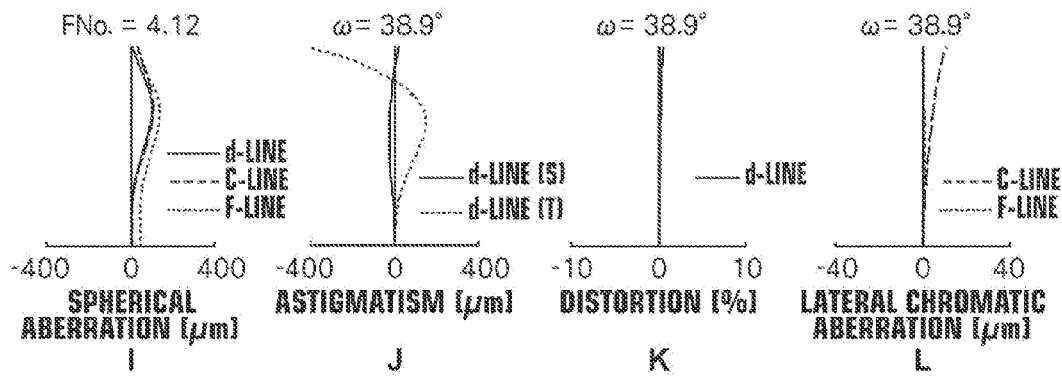

FIG.11
Example 5
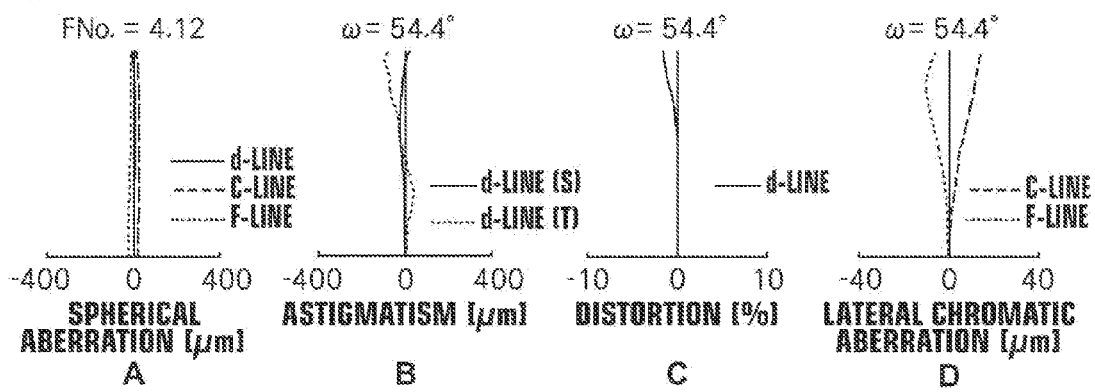
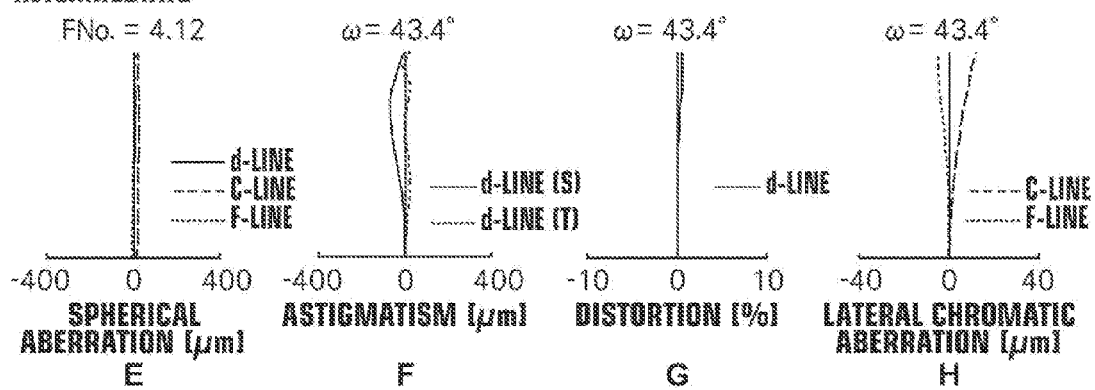
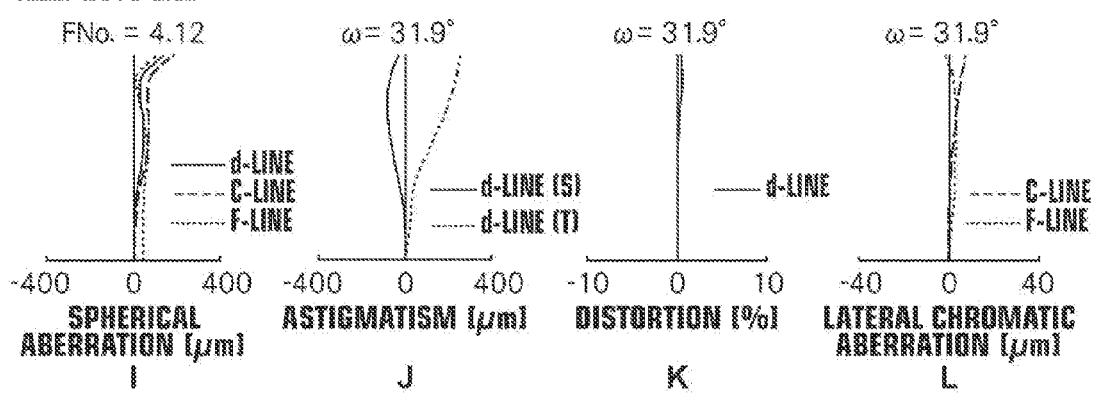

ZOOM LENS AND IMAGING APPARATUS

CROSS-REFERENCE TO RELATED APPLICATIONS

The present application claims priority under 35 U.S.C. §119 to Japanese Patent Application No. 2013-234861, filed on Nov. 13, 2013. The above application is hereby expressly incorporated by reference, in its entirety, into the present application.

BACKGROUND OF THE INVENTION

1. Technical Field

The present invention relates to a zoom lens suited for electronic cameras such as a digital camera, a video camera, a broadcasting camera, a movie camera, a surveillance camera, and the like, and to an imaging apparatus including the zoom lens.

2. Description of the Related Art

Conventionally, zoom type lenses in which a first lens group having a negative refractive power and a second lens group having a positive refractive power are arranged in front in this order from the object side are proposed as simple configurations of zoom lenses.

Further, some of those zoom type lenses, which achieve a wider angle of view as imaging lenses for interchangeable lenses to be used for lens interchangeable type cameras, are disclosed in Patent Documents 1 through 5 (Japanese Unexamined Patent Publication No. 2010-217535, Japanese Unexamined Patent Publication No. 2010-249956, Japanese Unexamined Patent Publication No. 2010-176098, Japanese Unexamined Patent Publication No. 2012-208378, and Japanese Unexamined Patent Publication No. 2012-225987). Note that forming a negative-lead type zoom lens relatively facilitates widening of the angle of view.

SUMMARY OF THE INVENTION

Accompanying the miniaturization and image-quality enhancement of digital cameras, and the like in recent years, there tends to be a demand for lenses to be compact and have high optical performance.

However, it cannot be said that the lenses disclosed in Patent Documents 1 and 2 are those which are sufficiently compact, because they have long total lengths, partly because these lenses secure a large amount of back focus.

Further, the lens disclosed in Patent Document 3 has a configuration in which a large amount of back focus is not secured. Referring to the image size of Example, the lens disclosed in Patent Document 3 is an image sensor having the diagonal line of approximately 21.63 mm. The entire lens system will be required to be proportionally enlarged in order to correspond to an APS-C type image sensor having the diagonal line of approximately 28.4 mm. This causes a problem that the lens system will be made excessively large.

Further, it cannot be said that the lenses disclosed in Patent Documents 4 and 5 are those having sufficiently wide angles of view, because they have full angles of view of approximately 100 degrees at a maximum at the wide angle end.

The present invention has been developed in view of the above circumstances. It is an object of the present invention to provide a compact zoom lens having a short total length in which a wider angle of view is achieved and various aberrations are satisfactorily corrected, and an imaging apparatus including the lens.

A zoom lens of the present invention substantially consists of a first lens group having a negative refractive power, a second lens group having a positive refractive power, a third lens group having a negative refractive power, a fourth lens group having a positive refractive power, and a fifth lens group having a positive refractive power in this order from the object side; wherein the first lens group through the fourth lens group move along the optical axis while changing magnification from the wide angle end to the telephoto end so as to change the distances among one another such that the distance between the first lens group and the second lens group is reduced and the distance between the second lens group and the third lens group is increased;

the fifth lens group is fixed with respect to an image surface while changing magnification; and conditional formulas (1) and (2) below are satisfied:

$$0.15 < |f1|/f2 < 1.00 \qquad (1)$$

$$0.1 < f4/f5 < 1.1 \qquad (2), \text{where}$$

f1: the focal length of the first lens group,
f2: the focal length of the second lens group,
f4: the focal length of the fourth lens group, and
f5: the focal length of the fifth lens group.

It is preferable for the zoom lens of the present invention to include a stop between the most-image-side surface of the first lens group and the most-object-side surface of the third lens group. It is also preferable for this stop to move integrally with the second lens group while changing magnification.

Further, it is preferable for the most-object-side lens of the fourth lens group to substantially consist of a single lens having a positive refractive power and for conditional formula (3) below to be satisfied:

$$0.2 < f41/f4 < 1.0 \qquad (3), \text{where}$$

f41: the focal length of the most-object-side single lens of the fourth lens group.

It is preferable for the most-object-side lens of the fourth lens group to substantially consist of a single lens having a positive refractive power. It is also preferable for this single lens to move along the direction of the optical axis to perform focusing.

It is preferable for the fourth lens group to include a cemented lens formed by two lenses having refractive powers having different signs and for conditional formula (4) below to be satisfied:

$$30 < vdp - vdn < 45 \qquad (4), \text{where}$$

vdp: the Abbe number with respect to the d-line (wavelength: 587.6 nm) of at least one positive lens which constitutes the cemented lens within the fourth lens group, and
vdn: the Abbe number with respect to the d-line (wavelength: 587.6 nm) of at least one negative lens which constitutes the cemented lens within the fourth lens group.

Further, the fourth lens group may substantially consist of a biconvex lens having a positive refractive power and a cemented lens formed by cementing a lens having a negative refractive power with a concave surface toward the image side, of which the absolute value of the radius of curvature is smaller than that of the object-side surface, a lens having a positive refractive power and a lens having a negative refractive power together, in this order from the object side. Alternatively, the fourth lens group may substantially consist of a biconvex lens having a positive refractive power, a cemented lens formed by cementing a lens having a negative refractive power with a concave surface toward the image side, of which the absolute value of the radius of curvature is smaller than that of the object-side surface and a lens having a positive refractive power together, and a lens having a negative refractive power, in this order from the object side.

It is preferable for conditional formula (5) below to be satisfied:

$$0.1 < D45t/f4 < 1.1 \quad (5),$$

where D45t: the distance between the most-image-side-surface apex of the fourth lens group at the telephoto and the most-object-side-surface apex of the fifth lens group at the telephoto end.

It is preferable for conditional formula (6) below to be satisfied:

$$0.05 < bfw/f5 < 0.5 \quad (6),$$

where bfw: the back focus length at the wide angle end.

It is preferable for the fifth lens group to substantially consist of a single lens having a positive refractive power and for conditional formula (7) below to be satisfied:

$$-3.0 < (r51f+r51r)/(r51f-r51r) < 7.5 \quad (7),$$

where r51f: the radius of curvature of the object-side surface of the single lens which constitutes the fifth lens group, and r51r: the radius of curvature of the image-side surface of the single lens which constitutes the fifth lens group.

Further, it is preferable for conditional formula (8) below to be satisfied:

$$50 < \omega \quad (8),$$

where ω: a half angle of view (degree) at the wide angle end.

It is preferable for the zoom lens to satisfy conditional formula (1-1) below:

$$0.25 < |f1|/f2 < 0.90 \quad (1\text{-}1).$$

Further, it is preferable for conditional formula (2-1) below to be satisfied:

$$0.15 < f4/f5 < 0.9 \quad (2\text{-}1).$$

Further, it is preferable for the most-object-side lens of the fourth lens group to substantially consist of a single lens having a positive refractive power, and for conditional formula (3-1) below to be satisfied:

$$0.3 < f41/f4 < 0.8 \quad (3\text{-}1).$$

Further, it is preferable for the fourth lens group to include a cemented lens formed by two lenses having refractive powers of different signs together, and for conditional formula (4-1) below to be satisfied:

$$33 < vdp - vdn < 42 \quad (4\text{-}1).$$

Further, it is preferable for conditional formula (5-1) below to be satisfied:

$$0.3 < D45t/f4 < 0.9 \quad (5\text{-}1).$$

Further, it is preferable for conditional formula (6-1) below to be satisfied:

$$0.10 < bfw/f5 < 0.3 \quad (6\text{-}1).$$

Further, it is preferable for the fifth lens group to substantially consist of a single lens having a positive refractive power, and for conditional formula (7-1) below to be satisfied:

$$-1.5 < (r51f+r51r)/(r51f-r51r) < 5.0 \quad (7\text{-}1).$$

An imaging apparatus of the present invention is provided with the zoom lens of the present invention described above.

Note that the above expression "substantially consists of" intends to include a lens that includes lenses substantially without any refractive power; optical elements other than lenses such as stops, masks, glass covers, and filters; lens flanges; lens barrels; imaging elements; and mechanical components such as camera shake correction mechanisms; in addition to the lens groups listed above as constituent elements.

The surface shapes and the signs of the refractive powers of the above lens should be considered in paraxial regions if aspheric surfaces are included therein.

Advantageous Effects of the Invention

A zoom lens of the present invention substantially consists of a first lens group having a negative refractive power, a second lens group having a positive refractive power, a third lens group having a negative refractive power, a fourth lens group having a positive refractive power, and a fifth lens group having a positive refractive power in this order from the object side; wherein the first lens group through the fourth lens group move along the optical axis while changing magnification from the wide angle end to the telephoto end so as to change the distances among one another such that the distance between the first lens group and the second lens group is reduced and the distance between the second lens group and the third lens group is increased;

the fifth lens group is fixed with respect to an image surface while changing magnification; and conditional formulas (1) and (2) below are satisfied. This enables a compact zoom lens having a short total length to be realized, in which the full angle of view is approximately 110 degrees, which is a wide angle of view, and various aberrations are satisfactorily corrected.

$$0.15 < |f1|/f2 < 1.00 \quad (1)$$

$$0.1 < f4/f5 < 1.1 \quad (2).$$

Further, as the imaging apparatus of the present invention include the zoom lens of the present invention, miniaturization can be achieved and a high quality video image can be obtained.

BRIEF DESCRIPTION OF THE DRAWINGS

FIG. 2 is a collection of view illustrating optical paths of a zoom lens according to one embodiment (which is the same as Example 1).

FIG. 7 shows aberration diagrams A through L of the zoom lens according to Example 1 of the present invention.

FIG. 8 shows aberration diagrams A through L of the zoom lens according to Example 2 of the present invention.

FIG. 9 shows aberration diagrams A through L of the zoom lens according to Example 3 of the present invention.

FIG. 10 shows aberration diagrams A through L of the zoom lens according to Example 4 of the present invention.

FIG. 11 shows aberration diagrams A through L of the zoom lens according to Example 5 of the present invention.

DESCRIPTION OF THE PREFERRED EMBODIMENTS

Figure 1:
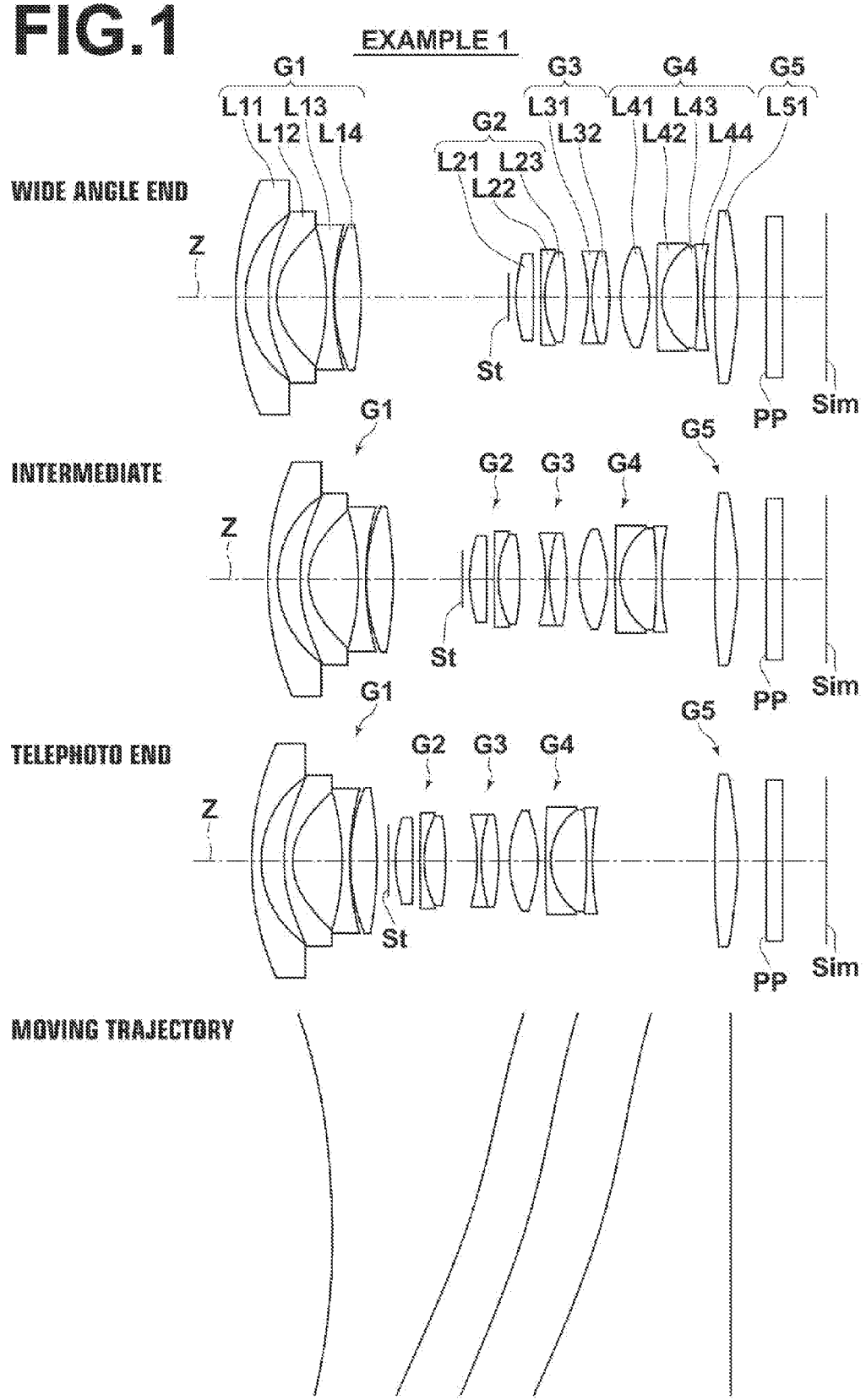
FIG. 1 is a collection of cross-sectional views of a zoom lens according to one embodiment (which is the same as Example 1) of the present invention, illustrating the lens configuration thereof.

Hereinafter, embodiments of the present invention will be described in detail with reference to the accompanying drawings. FIG. 1 is a collection of cross-sectional views of a zoom lens according to one embodiment of the present invention, illustrating the lens configuration thereof. FIG. 2 is a collection of views illustrating optical paths of the zoom lens described above. The example of a configuration shown in each of FIGS. 1 and 2 is the same as the configuration of the zoom lens of Example 1 to be described later. In FIGS. 1 and 2, the left side is the object side, and the right side is the image side. In addition, FIG. 2 also shows axial rays wa and rays wb having the maximum angle of view.

As shown in FIGS. 1 and 2, this zoom lens consists of a first lens group G1 having a negative refractive power, a second lens group G2 having a positive refractive power, a third lens group G3 having a negative refractive power, a fourth lens group G4 having a positive refractive power, and a fifth lens group G5 having a positive refractive power along the optical axis in this order from the object side.

When this zoom lens is applied to the imaging apparatus, it is preferable for a cover glass, a prism, various types of filters, such as an infrared cut filter, a low-pass filter, and the like to be provided between the optical system and the image surface Sim according to the configurations of a camera on which the lens is mounted. Each of FIGS. 1 and 2 illustrates an example in which a plane parallel optical member PP that presumes such components is provided between the lens system and the image surface Sim.

Such a configuration enables a wider angle of view and miniaturization of the lens system to be achieved. Further, arranging the fifth lens group G5 having a positive refractive power is advantageous from the viewpoint from shortening the total length and reducing the angle of rays entering the image formation plane.

Further, the zoom lens of the present embodiment is configured in such a manner that the first lens group G1 through the fourth lens group G4 move along the optical axis Z while changing magnification from the wide angle end to the telephoto end so as to change the distances among one another such that the distance between the first lens group G1 and the second lens group G2 is reduced and the distance between the second lens group G2 and the third lens group G3 is increased; and the fifth lens group G5 is fixed with respect to the image surface while changing magnification.

Configuring the first lens group G1 through the fourth lens group G4 while changing magnification in such a manner as described above can reduce the amount of movement of each lens group while changing magnification. Thereby, the length of a tube of a lens barrel can be reduced and miniaturization of the lens can be achieved while securing a zoom ratio. Further, the fifth lens group G5 is fixed with respect to the image surface while changing magnification. This is advantageous from the viewpoint from attaining telecentricity. In addition, it is possible to expect the advantageous effect such that dust and the like are prevented from entering the interior of the lens barrel.

The zoom lens is configured to satisfy conditional formulas (1) and (2) below:

Setting the value of $|f1|/f2$ so as not to fall below the lower limit defined by conditional formula (1) can suppress an increase in the power of the first lens group G1. Thereby, field curvature can be reduced. Further, setting the value of $|f1|/f2$ so as not to exceed the upper limit defined by conditional formula (1) can suppress an increase in the power of the second lens group G2. Thereby, correcting spherical aberration as well as widening an angle of view will be facilitated.

Setting the value of $f4/f5$ so as not to fall below the lower limit defined by conditional formula (2) can suppress an increase in the power of the fourth lens group G4 and a decrease in the power of the fifth lens group G5. Thereby, a shading phenomenon, in which the angle of the off-axis rays entering a sensor will increase such that the sensor cannot sufficiently take in light, will become less likely to occur. Further, setting the value of $f4/f5$ so as not to exceed the upper limit defined by conditional formula (2) can reduce astigmatism which occur in the fourth lens group G4 and the fifth lens group G5.

Note that satisfying conditional formulas (1-1) and/or (1-2) below realizes more favorable characteristics.

$$0.15<|f1|/f2<1.00 \qquad (1)$$

$$0.25<|f1|/f2<0.90 \qquad (1\text{-}1)$$

$$0.1<f4/f5<1.1 \qquad (2)$$

$$0.15<f4/f5<0.9 \qquad (2\text{-}1), \text{where}$$

f1: the focal length of the first lens group,
f2: the focal length of the second lens group,
f4: the focal length of the fourth lens group, and
f5: the focal length of the fifth lens group.

It is preferable for the zoom lens of the present embodiment to include the stop St between the most-image-side surface of the first lens group G1 and the most-object-side surface of the third lens group G3. It is also preferable for this stop St to move integrally with the second lens group while changing magnification. Note that the stop St shown in FIGS. 1 and 2 as one example does not necessarily represent the size or shape thereof, but represents the position thereof on the optical axis Z.

Disposing the stop St relatively in front within the entire lens in this manner is advantageous from the viewpoint of miniaturizing the lens because the radius of the first lens group G1 can be reduced while maintaining a wide angle of view. Further, such a disposition of the stop suppresses forward movement of the stop at the telephoto end, thereby enabling a fast lens having a small F number even at the telephoto end to be achieved.

It is preferable for the most-object-side lens L41 of the fourth lens group G4 to consist of a single lens having a positive refractive power and for conditional formula (3) below to be satisfied. Configuring the most-object-side lens L41 of the fourth lens group G4 to be a single lens having a positive refractive power can reduce the radii of the lenses that follow the fourth lens group G4. Setting the value of $f41/f4$ so as not to fall below the lower limit defined by conditional formula (3) can suppress an increase in the positive power of the most-object-side single lens L41 of the fourth lens group G4, which can suppress astigmatism and spherical aberration at the telephoto side. Further, setting the value of $f41/f4$ so as not to exceed the upper limit defined by conditional formula (3) can suppress increases in the radii of the lenses that follow the lens L41 within the fourth lens group G4. Thereby, The radius of the fourth lens group G4 itself can be reduced. Note that satisfying conditional formula (3-1) below realizes more favorable characteristics.

$$0.2 < f41/f4 < 1.0 \quad (3)$$

$$0.3 < f41/f4 < 0.8 \quad (3\text{-}1), \text{where}$$

f41: the focal length of the most-object-side single lens of the fourth lens group, and
f4: the focal length of the fourth lens group.

It is preferable for the most-object-side lens of the fourth lens group G4 to consist of a single lens L41 having a positive refractive power and for this single lens L41 to move along the direction of the optical axis to perform focusing. Performing focusing at this position can reduce fluctuations in aberrations and angles of view during focusing operations because peripheral rays travels similarly from the wide angle end to the telephoto end. Further, performing focusing only by the single lens L41 can reduce the weight of a focusing lens, which increases the speed of automatic focusing operations.

It is preferable for the fourth lens group G4 to include a cemented lens formed by two lenses having refractive powers of different signs and for conditional formula (4) below to be satisfied. Disposing a cemented lens within the fourth lens group G4 can advantageously correct lateral chromatic aberration. Setting the value of vdp−vdn so as not to fall below the lower limit defined by conditional formula (4) can obtain sufficient advantageous effects of correction of chromatic aberration. Further, setting the value of vdp−vdn so as not to exceed the upper limit defined by conditional formula (4) can suppress an increase in the differences between the refractive index of the positive lens which constitutes the cemented lens and the refractive index of the negative lens which constitutes the cemented lens, and can reduce the influence by fluctuations in aberrations due to manufacturing errors. Note that satisfying conditional formula (4-1) below realizes more favorable characteristics.

$$30 < vdp - vdn < 45 \quad (4)$$

$$33 < vdp - vdn < 42 \quad (4\text{-}1), \text{where}$$

vdp: the Abbe number with respect to the d-line (wavelength: 587.6 nm) of at least one positive lens which constitutes the cemented lens within the fourth lens group, and
vdn: the Abbe number with respect to the d-line (wavelength: 587.6 nm) of at least one negative lens which constitutes the cemented lens within the fourth lens group.

Further, the fourth lens group G4 may consist of a biconvex lens L41 having a positive refractive power and a cemented lens formed by a lens L42 having a negative refractive power with a concave surface toward the image side, of which the absolute value of the radius of curvature is smaller than that of the object-side surface, a lens L43 having a positive refractive power, and a lens L44 having a negative refractive power together (which correspond to Examples 1 and 2 to be described later), in this order from the object side. Alternatively, the fourth lens group G4 may consist of a biconvex lens L41 having a positive refractive power, a cemented lens formed by a lens L42 having a negative refractive power with a concave surface toward the image side, of which the absolute value of the radius of curvature is smaller than that of the object side surface, and a lens L43 having a positive refractive power together, and a lens L44 having a negative refractive power, in this order from the object side (which corresponds to Examples 3 through 5).

Disposing the biconvex lens L41 having a positive refractive power at the most-object side can achieve miniaturization of the fourth lens group G4. Further, disposing a cemented lens formed by the lens L42 having a negative refractive power with a concave surface toward the image side, of which the absolute value of the radius of curvature is smaller than that of the object-side surface, and the lens L43 having a positive refractive power together on the image side of the lens L41 can correct chromatic aberration. Further, disposing the lens L44 having the negative refractive power on the image side can correct astigmatism satisfactorily. Note that the same advantageous effects can be obtained in the case that the lens L44 is cemented to the lens L42 and the lens L43 together.

It is preferable for conditional formula (5) below to be satisfied. Setting the value of D45t/f4 so as not to fall below the lower limit defined by conditional formula (5) can suppress a decrease in the power of the fourth lens group G4, thereby suppressing an increase in the total length of the lens at the telephoto end. Further, setting the value of D45t/f4 so as not to exceed the upper limit defined by conditional formula (5) can suppress an increase in the power of the fourth lens group G4, thereby reducing spherical aberration. Note that satisfying conditional formula (5-1) below realizes more favorable characteristics.

$$0.1 < D45t/f4 < 1.1 \quad (5)$$

$$0.3 < D45t/f4 < 0.9 \quad (5\text{-}1), \text{where}$$

D45t: the distance between the most-image-side-surface apex of the fourth lens group and the most-object-side-surface apex of the fifth lens group at the telephoto end, and
f4: the focal length of the fourth lens group.

It is preferable for conditional formula (6) below to be satisfied. Setting the value of bfw/f5 so as not to fall below the lower limit defined by conditional formula (6) can reduce the power of the fifth lens group G5 or can suppress a decrease in the length of back focus. Thereby, the rays passing through the fifth lens group G5 can be prevented from narrowing and the influence exerted by small flaws and dust during photography can be reduced. Further, setting the value of bfw/f5 so as not to exceed the upper limit defined by conditional formula (6) can suppress an increase in the radius of the fifth lens group G5, thereby enabling miniaturization of the entire lens system to be achieved. Note that satisfying conditional formula (6-1) below realizes more favorable characteristics.

$$0.05 < bfw/f5 < 0.5 \quad (6)$$

$$0.10 < bfw/f5 < 0.3 \quad (6\text{-}1), \text{where}$$

bfw: the back focal length at the wide angle end, and
f5: the focal length of the fifth lens group.

It is preferable for the fifth lens group G5 to consist of a single lens L51 having a positive refractive power and for conditional formula (7) below to be satisfied. Setting the value of $(r51f+r51r)/(r51f-r51r)$ so as not to fall below the lower limit defined by conditional formula (7) causes the single lens L51 which constitutes the fifth lens group G5 to have a relatively small concave surface toward the image side. This will cause light reflected by a cover glass disposed on a sensor surface or in the vicinity of the sensor to be less likely to become collected when the reflected light is reflected onto the single lens L51. This can suppress the occurrence of ghosts. Further, setting the value of $(r51f+r51r)/(r51f-r51r)$ so as not to exceed the upper limit defined by conditional formula (7) causes the single lens L51 to have a relatively small concave surface toward the side of the fourth lens group G4. This will facilitate securing a space between the fourth lens group G4 and the fifth lens group G5. Further, correction of field curvature and astigmatism will also be facilitated. Note that providing the single lens L51 with at least one aspherical surface can advantageously correct astigmatism and field curvature. Further, satisfying conditional formula (7-1) below realizes more favorable characteristics.

$$-3.0<(r51f+r51r)/(r51f-r51r)<7.5 \quad (7)$$

$$-1.5<(r51f+r51r)/(r51f-r51r)<5.0 \quad (7\text{-}1), \text{ where}$$

r51f: the radius of curvature of the object-side surface of the single lens which constitutes the fifth lens group, and
r51r: the radius of curvature of the image-side surface of the single lens which constitutes the fifth lens group.

It is preferable for conditional formula (8) below to be satisfied. Setting the value of ω so as not to fall below the lower limit defined by conditional formula (8) enables a sufficient angle of view to be secured.

$$50<\omega \quad (8), \text{ where}$$

ω: a half angle of view (degree) at the wide angle end.

In the present zoom lens, as a material disposed on the most-object side, in particular, a glass is preferably used, or a transparent ceramic may be employed.

Moreover, in the case that the present zoom lens is used in environments in which lenses are easily damaged, it is preferable for a multi-layer film coating for protection to be applied onto lenses. Moreover, in addition to a coating for protection, an antireflection coating may be applied onto lenses so as to reduce ghost light, and the like when using the lenses.

In the example of FIG. 1, the optical member PP is disposed between the lens system and the image surface Sim. Instead of disposing a low-pass filter, various kinds of filters which cut specific wavelength ranges, and the like between the lens system and the image surface Sim, these various kinds of filters may be disposed between lenses, or a coating, which exhibits the same effects as the various kinds of filters, may be applied onto the lens surfaces of any of the lenses.

Next, Numerical Examples of the zoom lens of the present invention will be described.

First, the zoom lens of Example 1 will be described. A collection of cross-sectional views of a zoom lens according to Example 1 illustrating the lens configuration thereof is shown in FIG. 1. Note that in FIG. 1, and FIGS. 2 through 5 respectively corresponding to Examples 3 through 6 to be described later, an optical member PP is also shown, and the left side is the object side and the right side is the image side. Further, the stop St shown in the Figures does not necessarily represent the size or shape thereof, but represents the position thereof on the optical axis Z.

Basic lens data of the zoom lens of Example 1 is shown in Table 1, data related to specs is shown in Table 2, data related to the distances between surfaces which move is shown in Table 3, and data related to aspherical surface coefficients is shown in Table 4. The meanings of the symbols in the Tables will be described below with reference to Example 1 as an example. The same basically applies to Examples 2 through 5.

In the lens data of Table 1, the i-th (i=1, 2, 3, . . . ) surface number, the value of i sequentially increasing from the surface of the constituent element at the most object side, which is designated as 1, toward the image side are shown in the column Si. The radii of curvature of the i-th surface are shown in the column Ri, and the distances between i-th surfaces and (i+1)st surfaces along the optical axis Z are shown in the column di. Further, the refractive indices of j-th (j=1, 2, 3, . . . ) optical elements with respect to the d-line (wavelength: 587.6 nm), the value of j sequentially increasing from the optical element at the most magnification side, which is designated as 1, toward the reduction side, are shown in the column ndj. The Abbe numbers of j-th optical elements with respect to the d-line (wavelength: 587.6 nm) are shown in the column vdj.

Here, the sign of the radius of curvature is positive in the case that a surface shape is convex on the object side, and negative in the case that the surface shape is convex on the image side. Basic lens data also shows a stop St and an optical member PP. The column of the surface number of a surface which corresponds to the stop St shows a surface number together with the word "stop". Moreover, in the lens data of Table 1, the column of each of the distances between surfaces that vary while changing magnification shows DD[i]. The value of the bottom column of di is the distance between an image-side surface from the optical member PP and the image surface Sim.

Data related to specs at Table 2 shows the zoom ratio, the focal length f', the back focus Bf', the F-number FNo., and the full angle view 2ω of each of at the wide angle end, the intermediate, and the telephoto end.

In the basic lens data, data related to specs, and data related to the distances between surfaces which move, degrees are used as the unit of angles and mm is used as the unit of length, but other appropriate units may also be used, as optical systems are usable even when they are proportionally enlarged or miniaturized.

In the lens data of Table 1, the mark "*" is indicated at surface numbers of aspherical surfaces. Numerical values of paraxial radii of curvature are indicated as the radii of curvature of the aspherical surfaces. The data related to aspherical surface coefficients of Table 4 show surface numbers Si of aspheric surfaces, and aspherical surface coefficients with respect to these aspheric surfaces. The aspherical surface coefficients shows values of respective coefficients KA, Am (m=3, 4, 5, . . . 12) in the aspherical surface expression (A) below.

$$Zd=C\cdot h^2/\{1+(1-KA\cdot C^2\cdot h^2)^{1/2}\}+\Sigma Am\cdot h^m \quad (A), \text{ where}$$

Zd: the depth of an aspheric surface (the length of a perpendicular line drawn from a point on an aspheric surface with a height h to a plane perpendicular to the optical axis which contacts the peak of the aspheric surface)
h: height (the distance from the optical axis)
C: an inverse number of a paraxial radius of curvature
KA, Am: aspherical surface coefficients (m=3, 4, 5, . . . 12).

TABLE 1

Example 1 Lens Data (n, ν is d-line)

| Si (Surface Numbers) | Ri (Radii of Cuvature) | di (Distances Between Surfaces) | ndj (Refractive Ratios) | vdj (Abbe Numbers) |
|---|---|---|---|---|
| 1 | 48.9076 | 1.7000 | 1.754999 | 52.32 |
| 2 | 17.1234 | 4.0000 | | |
| *3 | 35.6783 | 1.5000 | 1.740250 | 49.12 |
| *4 | 11.9671 | 8.6800 | | |
| 5 | −39.7818 | 1.3000 | 1.592824 | 68.63 |
| 6 | 44.8286 | 0.1000 | | |
| 7 | 32.2764 | 4.6700 | 1.882997 | 40.76 |
| 8 | −67.7357 | DD[8] | | |
| 9(stop) | ∞ | 1.3000 | | |
| *10 | 22.3243 | 3.0000 | 1.581029 | 59.23 |
| *11 | −3623.6878 | 1.3000 | | |

TABLE 1-continued

Example 1 Lens Data (n, ν is d-line)

| Si (Surface Numbers) | Ri (Radii of Cuvature) | di (Distances Between Surfaces) | ndj (Refractive Ratios) | νdj (Abbe Numbers) |
|---|---|---|---|---|
| 12 | 577.6778 | 0.7100 | 1.816000 | 46.62 |
| 13 | 16.6190 | 3.8000 | 1.733997 | 51.47 |
| 14 | −41.8885 | DD[14] | | |
| 15 | −27.9410 | 0.7100 | 1.772499 | 49.60 |
| 16 | 26.1820 | 3.0600 | 1.496999 | 81.54 |
| 17 | −39.8440 | DD[17] | | |
| *18 | 18.4297 | 5.0000 | 1.497103 | 81.56 |
| *19 | −17.5629 | 1.3000 | | |
| 20 | 220.7677 | 0.9100 | 1.804000 | 46.58 |
| 21 | 10.6520 | 6.3000 | 1.496999 | 81.54 |
| 22 | −83.5500 | 1.0000 | 1.696797 | 55.53 |
| 23 | 49.9738 | DD[23] | | |
| *24 | 416.7292 | 4.0000 | 1.693500 | 53.18 |
| *25 | −48.3381 | 5.0000 | | |
| 26 | ∞ | 2.8500 | 1.516798 | 64.20 |
| 27 | ∞ | 7.6391 | | |

TABLE 2

Example 1 Specs (the d-line)

| | Wide Angle End | Intermediate | Telephoto End |
|---|---|---|---|
| Zoom Ratios | 1.0 | 1.5 | 2.3 |
| f | 10.33 | 15.20 | 23.36 |
| Bf (in air) | 14.52 | 14.52 | 14.52 |
| FNo. | 4.12 | 4.12 | 4.12 |
| 2ω[°] | 112.0 | 86.0 | 61.6 |

TABLE 3

Example 1 Distances Associated With Zooming

| | Wide Angle End | Intermediate | Telephoto End |
|---|---|---|---|
| DD[8] | 25.91 | 12.14 | 1.97 |
| DD[14] | 3.75 | 4.44 | 5.50 |
| DD[17] | 1.97 | 2.14 | 1.90 |
| DD[23] | 2.00 | 9.28 | 21.46 |

TABLE 4

Example 1 Aspherical Surface Coefficients

| Surface Numbers | 3 | 4 | 10 |
|---|---|---|---|
| KA | 1.0000000E+00 | −3.2984320E+00 | 1.0000000E+00 |
| A3 | 0.0000000E+00 | −4.4558881E−06 | 0.0000000E+00 |
| A4 | 2.5843180E−04 | 5.5484444E−04 | 1.9450862E−06 |
| A5 | −7.8805637E−06 | −1.2840395E−05 | −2.6510883E−05 |
| A6 | −3.5980953E−06 | −4.0404631E−06 | 9.2762597E−06 |
| A7 | 1.6095961E−07 | −2.0257653E−07 | −1.0108176E−06 |
| A8 | 2.2978051E−08 | 4.3385992E−08 | −1.3268194E−07 |
| A9 | −1.5416422E−09 | 2.0356520E−09 | 3.3304332E−08 |
| A10 | −4.0438312E−11 | −2.8487869E−10 | −6.2858817E−10 |
| A11 | 5.0566122E−12 | −3.3536803E−12 | −2.6696016E−10 |
| A12 | −9.9545849E−14 | 5.6528700E−13 | 1.4450909E−11 |

| Surface Numbers | 11 | 18 | 19 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 4.3055171E−05 | 1.3578295E−05 | 8.3287140E−05 |
| A5 | −4.7563942E−05 | −9.1406993E−06 | 9.4589632E−06 |
| A6 | 1.5741695E−05 | 5.1811411E−07 | −3.5236718E−06 |
| A7 | −1.3970041E−06 | 3.2116393E−07 | 5.8093125E−07 |
| A8 | −3.3239681E−07 | −3.7667873E−08 | −1.2202069E−09 |
| A9 | 6.9972366E−08 | −3.1136060E−09 | −9.8162042E−09 |
| A10 | −5.4620266E−10 | 5.4785448E−10 | 6.9266610E−10 |
| A11 | −7.1336476E−10 | 8.4337876E−12 | 4.3240880E−11 |
| A12 | 4.1858983E−11 | −2.3865100E−12 | −4.4223065E−12 |

| Surface Numbers | 24 | 25 |
|---|---|---|
| KA | 1.0000000E+00 | 1.0000000E+00 |
| A3 | 0.0000000E+00 | 0.0000000E+00 |
| A4 | −1.4524716E−04 | −1.0149458E−04 |
| A5 | 4.0453268E−05 | 1.7019957E−05 |
| A6 | −3.4384459E−06 | 1.5504919E−06 |
| A7 | −1.8524677E−08 | −4.6722636E−07 |
| A8 | 1.8204920E−08 | 2.4336798E−08 |
| A9 | −3.5828397E−10 | 1.3179759E−09 |
| A10 | −4.3555141E−11 | −1.3035736E−10 |
| A11 | 4.8895266E−13 | −1.3218710E−13 |
| A12 | 5.6568011E−14 | 1.4069497E−13 |

Aberration diagrams of the zoom lens of Example 1 are shown in A through L of FIG. 7. A through D of FIG. 7 respectively show spherical aberration, astigmatism, distortion, and lateral chromatic aberration at infinity at the wide angle end; E through H of FIG. 7 respectively show spherical aberration, astigmatism, distortion, and lateral chromatic aberration at infinity at the intermediate; and I through L of FIG. 7 respectively show spherical aberration, astigmatism, distortion, and lateral chromatic aberration at infinity at the telephoto end.

The aberration diagrams respectively showing spherical aberration, astigmatism, and distortion represents the d-line (a wavelength of 587.6 nm) as a reference wavelength. The spherical aberration diagram shows aberrations with respect to the d-line (a wavelength of 587.6 nm), the C-line (a wavelength of 656.3 nm), and the F-line (a wavelength of 486.1 nm) respectively indicated by a solid line, a broken line, and a dotted line. In the astigmatism diagrams, the solid line illustrates astigmatism in the sagittal direction while the dotted line illustrates astigmatism in the tangential direction. In the lateral chromatic aberration diagram, aberrations with respect to the C-line (a wavelength of 656.3 nm) and the F-line (a wavelength of 486.1 nm) are respectively indicated by a broken line and a dotted line. Note that in spherical aberration diagrams, FNo. refers to a F-number, and in the other aberration diagrams, ω refers to a half angle of view.

Figure 3:
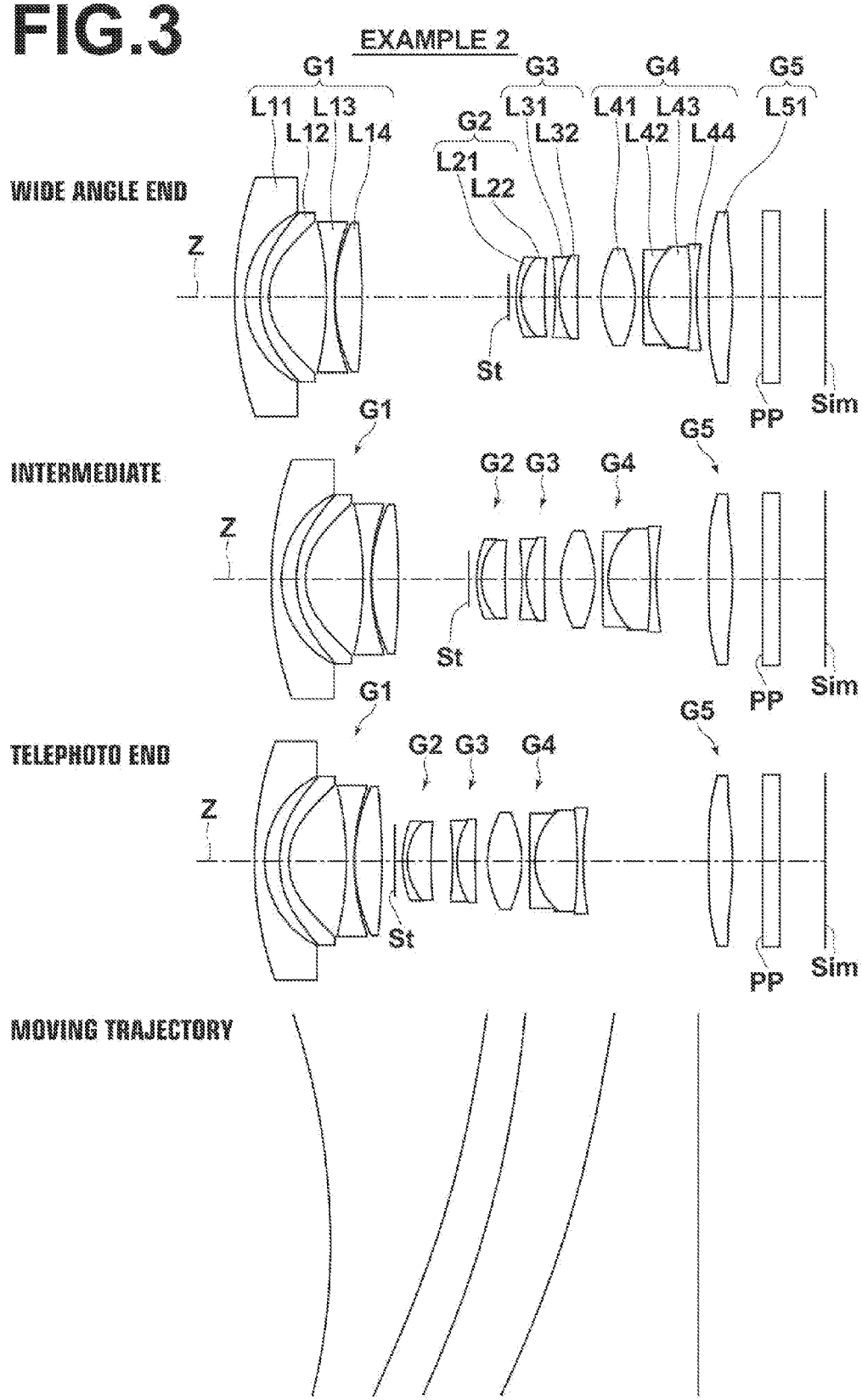
FIG. 3 is a collection of cross-sectional views of a zoom lens according to Example 2 of the present invention, illustrating the lens configuration thereof.

Next, a zoom lens of Example 2 will be described. FIG. 3 shows a collection of cross-sectional views of the zoom lens of Example 2, illustrating the lens configuration thereof. Moreover, basic lens data of the zoom lens of Example 2 are shown in Table 5, data related to specs thereof are shown in Table 6, data related to the distances between surfaces which move thereof are shown in Table 7, data related to aspherical surface coefficients are shown in Table 8, and the respective aberration diagrams are shown in A through L of FIG. 8.

TABLE 5

Example 2 Lens Data (n, ν is d-line)

| Si (Surface Numbers) | Ri (Radii of Cuvature) | di (Distances Between Surfaces) | ndj (Refractive Ratios) | vdj (Abbe Numbers) |
|---|---|---|---|---|
| 1 | 56.7618 | 1.7000 | 1.754999 | 52.32 |
| 2 | 15.3482 | 2.4999 | | |
| *3 | 18.5184 | 1.5000 | 1.743300 | 49.33 |
| *4 | 10.9720 | 9.5826 | | |
| 5 | −49.5242 | 1.3000 | 1.592824 | 68.63 |
| 6 | 34.7691 | 0.0999 | | |
| 7 | 28.2554 | 4.5000 | 1.882997 | 40.76 |
| 8 | −116.5319 | DD[8] | | |
| 9(stop) | ∞ | 1.3000 | | |
| 10 | 16.7654 | 0.8102 | 1.738000 | 32.26 |
| 11 | 9.3773 | 3.9374 | 1.730766 | 40.50 |
| *12 | 83.3312 | DD[12] | | |
| 13 | −55.8061 | 0.7102 | 1.696797 | 55.53 |
| 14 | 13.0206 | 3.0006 | 1.496999 | 81.54 |
| 15 | 124.5487 | DD[15] | | |
| *16 | 14.5364 | 5.6990 | 1.497103 | 81.56 |
| *17 | −14.7753 | 1.3000 | | |
| 18 | 326.1575 | 0.9100 | 1.799516 | 42.22 |
| 19 | 10.6383 | 7.0101 | 1.496999 | 81.54 |
| 20 | −83.3343 | 1.0000 | 1.696797 | 55.53 |
| 21 | 50.0000 | DD[21] | | |
| *22 | 291.4901 | 4.0000 | 1.693500 | 53.20 |
| *23 | −45.3124 | 5.0000 | | |
| 24 | ∞ | 2.8500 | 1.516798 | 64.20 |
| 25 | ∞ | 7.5846 | | |

TABLE 6

Example 2 Specs (the d-line)

| | Wide Angle End | Intermediate | Telephoto End |
|---|---|---|---|
| Zoom Ratios | 1.0 | 1.5 | 2.3 |
| f | 10.31 | 15.14 | 23.33 |
| Bf (in air) | 14.46 | 14.46 | 14.46 |
| FNo. | 4.12 | 4.12 | 4.12 |
| 2ω[°] | 110.0 | 86.2 | 62.2 |

TABLE 7

Example 2 Distances Associated With Zooming

| | Wide Angle End | Intermediate | Telephoto End |
|---|---|---|---|
| DD[8] | 24.36 | 11.69 | 2.15 |
| DD[12] | 1.75 | 2.82 | 3.62 |
| DD[15] | 3.92 | 2.74 | 2.09 |
| DD[21] | 2.00 | 8.70 | 20.88 |

TABLE 8

Example 2 Aspherical Surface Coefficients

| Surface Numbers | 3 | 4 | 12 |
|---|---|---|---|
| KA | 1.0000000E+00 | −2.3658974E+00 | 1.0000000E+00 |
| A3 | 0.0000000E+00 | 0.0000000E+00 | 8.4703295E−20 |
| A4 | 7.7934650E−05 | 3.4631167E−04 | −9.1976813E−06 |
| A5 | 1.9486329E−05 | 1.7293869E−05 | 9.5340086E−06 |
| A6 | −3.0722748E−06 | −3.9276516E−06 | 1.2043843E−06 |
| A7 | −8.7609078E−08 | −2.4743933E−07 | −9.5413842E−07 |
| A8 | 2.9673536E−08 | 4.2509395E−08 | 6.6547396E−08 |
| A9 | −1.1031454E−09 | −4.0678069E−10 | 2.3514533E−08 |
| A10 | −6.2563721E−11 | −1.3679162E−10 | −2.7793899E−09 |
| A11 | 5.9372719E−12 | 7.5603300E−12 | −1.7038285E−10 |
| A12 | −1.3634522E−13 | −1.5529713E−13 | 2.4716104E−11 |

TABLE 8-continued

Example 2 Aspherical Surface Coefficients

| Surface Numbers | 16 | 17 | 22 |
|---|---|---|---|
| KA | 1.0000000E+00 | 1.0000000E+00 | 1.0000000E+00 |
| A3 | 1.4985194E−19 | 0.0000000E+00 | 1.8528846E−19 |
| A4 | −1.4046440E−04 | 7.5375246E−05 | 4.1502312E−05 |
| A5 | 2.9465353E−05 | 4.4240873E−06 | −5.1819967E−06 |
| A6 | −4.8998815E−06 | 2.5220269E−06 | 6.9888453E−07 |
| A7 | 1.6710067E−07 | −6.9363214E−07 | −9.5598381E−09 |
| A8 | 5.9106754E−08 | 1.7314679E−08 | −2.0677598E−09 |
| A9 | −6.4134141E−09 | 1.0846228E−08 | 2.8250219E−11 |
| A10 | −5.0915410E−11 | −7.9548858E−10 | 3.7702745E−12 |
| A11 | 3.1633512E−11 | −4.6269771E−11 | 5.3794370E−14 |
| A12 | −1.0215182E−12 | 4.5923842E−12 | −1.4268910E−14 |

| Surface Numbers | 23 |
|---|---|
| KA | 1.0000000E+00 |
| A3 | −1.6940659E−19 |
| A4 | 5.1571224E−05 |
| A5 | −7.6009489E−06 |
| A6 | 1.2296387E−06 |
| A7 | −4.8557846E−08 |
| A8 | −4.8485392E−09 |
| A9 | 6.1812060E−10 |
| A10 | −1.2587034E−11 |
| A11 | −1.4287281E−12 |
| A12 | 5.4508773E−14 |

Figure 4:
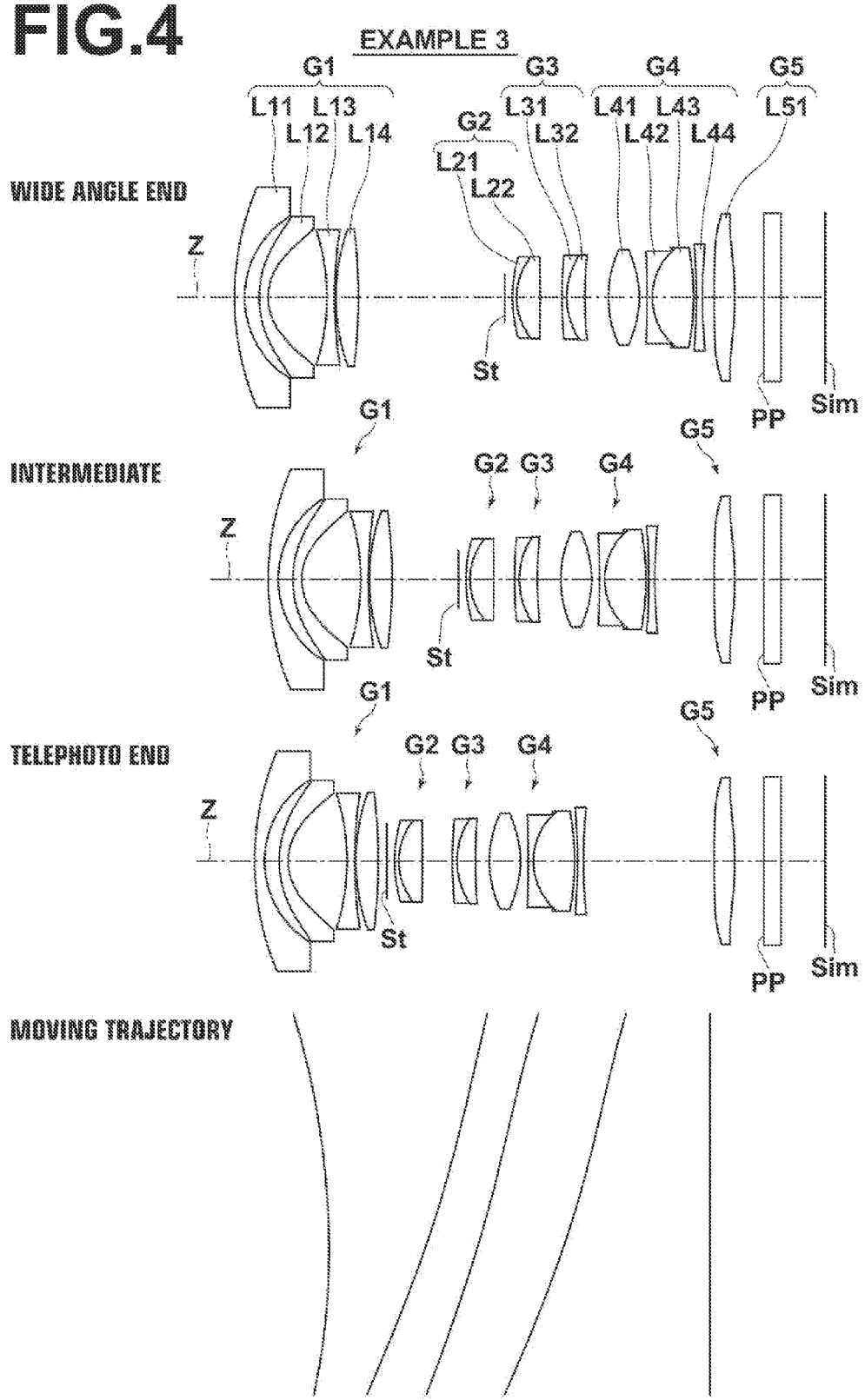
FIG. 4 is a collection of cross-sectional views of a zoom lens according to Example 3 of the present invention, illustrating the lens configuration thereof.

Next, a zoom lens of Example 3 will be described. FIG. 4 shows a collection of cross-sectional views of the zoom lens of Example 3, illustrating the lens configuration thereof. Moreover, basic lens data of the zoom lens of Example 3 are shown in Table 9, data related to specs thereof are shown in Table 10, data related to the distances between surfaces which move thereof are shown in Table 11, data related to aspherical surface coefficients are shown in Table 12, and the respective aberration diagrams are shown in A through L of FIG. 9.

TABLE 9

Example 3 Lens Data (n, ν is d-line)

| Si (Surface Numbers) | Ri (Radii of Cuvature) | di (Distances Between Surfaces) | ndj (Refractive Ratios) | νdj (Abbe Numbers) |
|---|---|---|---|---|
| 1 | 46.1626 | 1.7000 | 1.754999 | 52.32 |
| 2 | 15.6654 | 2.5001 | | |
| *3 | 18.5185 | 1.5000 | 1.743300 | 49.33 |
| *4 | 9.1667 | 10.0002 | | |
| 5 | −35.6209 | 1.3000 | 1.592824 | 68.63 |
| 6 | 72.1608 | 0.1999 | | |
| 7 | 32.9637 | 3.8485 | 1.882997 | 40.76 |
| 8 | −88.9919 | DD[8] | | |
| 9(stop) | ∞ | 1.3000 | | |
| 10 | 23.2681 | 0.7098 | 1.749505 | 35.33 |
| 11 | 10.6134 | 4.0002 | 1.730766 | 40.50 |
| *12 | −217.4043 | DD[12] | | |
| 13 | 70.6398 | 0.8100 | 1.816000 | 46.62 |
| 14 | 12.5439 | 3.1009 | 1.496999 | 81.54 |
| 15 | 80.2554 | DD[15] | | |
| *16 | 18.3966 | 5.2661 | 1.497103 | 81.56 |
| *17 | −15.5480 | 1.2998 | | |
| 18 | −190.2596 | 0.9100 | 1.816000 | 46.62 |
| 19 | 10.6329 | 6.9998 | 1.496999 | 81.54 |
| 20 | −43.2024 | 0.5002 | | |
| 21 | −93.8146 | 0.9998 | 1.772499 | 49.60 |
| 22 | 83.3309 | DD[22] | | |
| *23 | 207.1855 | 3.4998 | 1.693500 | 53.20 |
| *24 | −61.1919 | 5.0000 | | |

TABLE 9-continued

Example 3 Lens Data (n, ν is d-line)

| Si (Surface Numbers) | Ri (Radii of Cuvature) | di (Distances Between Surfaces) | ndj (Refractive Ratios) | νdj (Abbe Numbers) |
|---|---|---|---|---|
| 25 | ∞ | 2.8500 | 1.516798 | 64.20 |
| 26 | ∞ | 7.5660 | | |

TABLE 10

Example 3 Specs (the d-line)

| | Wide Angle End | Intermediate | Telephoto End |
|---|---|---|---|
| Zoom Ratios | 1.0 | 1.5 | 2.3 |
| f | 10.31 | 15.15 | 23.33 |
| Bf (in air) | 14.44 | 14.44 | 14.44 |
| FNo. | 4.12 | 4.12 | 4.12 |
| 2ω[°] | 109.2 | 86.0 | 62.4 |

TABLE 11

Example 3 Distances Associated With Zooming

| | Wide Angle End | Intermediate | Telephoto End |
|---|---|---|---|
| DD[8] | 24.89 | 11.26 | 1.47 |
| DD[12] | 3.71 | 3.55 | 5.10 |
| DD[15] | 3.97 | 3.95 | 2.39 |
| DD[22] | 2.00 | 10.09 | 22.20 |

TABLE 12

Example 3 Aspherical Surface Coefficients

| Surface Numbers | 3 | 4 | 12 |
|---|---|---|---|
| KA | 1.0000000E+00 | −2.4466163E−00 | 1.0000000E+00 |
| A3 | −1.5791748E−19 | 7.4330164E−20 | −8.4703295E−20 |
| A4 | 7.4708761E−05 | 5.6448129E−04 | 9.7782586E−06 |
| A5 | 2.2006315E−05 | 9.9318182E−06 | 1.1312299E−05 |
| A6 | −4.3893283E−06 | −6.0984273E−06 | −2.9080474E−06 |
| A7 | −4.5156322E−08 | −3.3522638E−07 | 1.9711136E−07 |
| A8 | 4.0413793E−08 | 6.9179199E−08 | 4.3336133E−08 |
| A9 | −1.5707268E−09 | 1.4240991E−09 | −7.1671371E−09 |
| A10 | −9.2483596E−11 | −3.6694221E−10 | −2.3771021E−11 |
| A11 | 7.1736074E−12 | 1.5824701E−13 | 5.4765721E−11 |
| A12 | −1.2123136E−13 | 5.9541787E−13 | −2.3651574E−12 |

| Surface Numbers | 16 | 17 | 23 |
|---|---|---|---|
| KA | 1.0000000E+00 | 1.0000000E+00 | 1.0000000E+00 |
| A3 | −2.9970387E−19 | 0.0000000E+00 | −1.6940659E−19 |
| A4 | −6.6464608E−05 | 3.9611343E−05 | −1.2510722E−04 |
| A5 | 3.4256164E−05 | 1.6146359E−05 | 2.9409087E−05 |
| A6 | −7.3095040E−06 | −2.1858179E−07 | −1.9695220E−06 |
| A7 | 4.7354527E−07 | −5.8328847E−07 | −5.7286704E−08 |
| A8 | 7.1823396E−08 | 5.5497020E−08 | 1.6073819E−08 |
| A9 | −1.1026807E−08 | 7.7064910E−09 | −4.5543815E−10 |
| A10 | 1.4041349E−11 | −1.0450619E−09 | −3.2579672E−11 |
| A11 | 5.1713400E−11 | −3.0123786E−11 | 1.4350072E−12 |
| A12 | −1.3400706E−12 | 5.5692013E−12 | −3.4159547E−16 |

| Surface Numbers | 24 |
|---|---|
| KA | 1.0000000E+00 |
| A3 | −1.6940659E−19 |
| A4 | −1.1538893E−04 |
| A5 | 2.1777779E−05 |
| A6 | −4.7755039E−07 |
| A7 | −1.5001165E−07 |
| A8 | 1.0807561E−08 |
| A9 | 4.8558503E−10 |
| A10 | −5.2467779E−11 |
| A11 | −6.1693754E−13 |
| A12 | 8.1904481E−14 |

Figure 5:
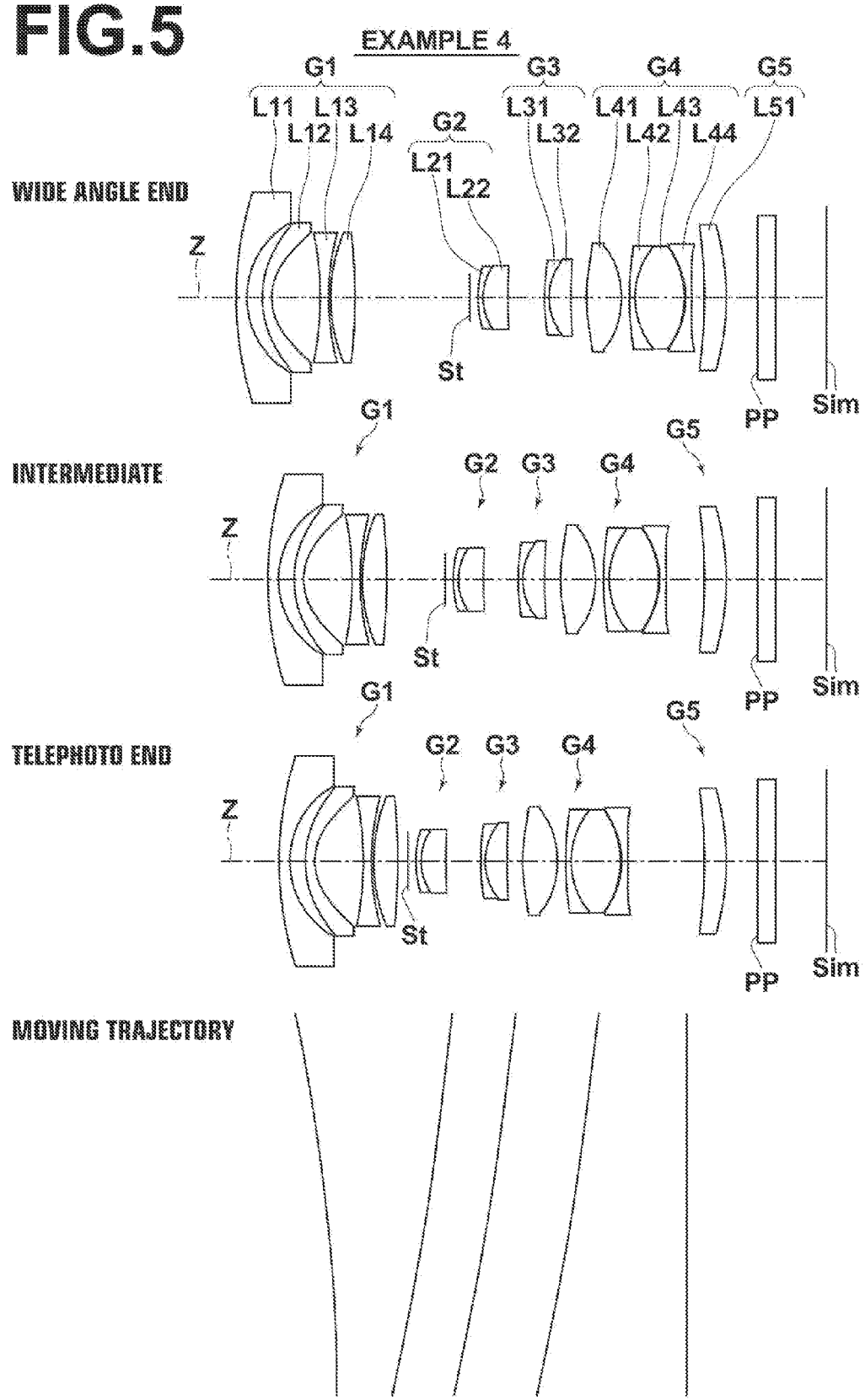
FIG. 5 is a collection of cross-sectional views of a zoom lens according to Example 4 of the present invention, illustrating the lens configuration thereof.

Next, a zoom lens of Example 4 will be described. FIG. 5 shows a collection of cross-sectional views of the zoom lens of Example 4, illustrating the lens configuration thereof. Moreover, basic lens data of the zoom lens of Example 4 are shown in Table 13, data related to specs thereof are shown in Table 14, data related to the distances between surfaces which move thereof are shown in Table 15, data related to aspherical surface coefficients are shown in Table 16, and the respective aberration diagrams are shown in A through L of FIG. 10.

TABLE 13

Example 4 Lens Data (n, ν is d-line)

| Si (Surface Numbers) | Ri (Radii of Cuvature) | di (Distances Between Surfaces) | ndj (Refractive Ratios) | νdj (Abbe Numbers) |
|---|---|---|---|---|
| 1 | 52.9966 | 1.6998 | 1.754999 | 52.32 |
| 2 | 13.3598 | 2.4998 | | |
| *3 | 18.5184 | 1.4999 | 1.743300 | 49.33 |
| *4 | 9.3336 | 7.7314 | | |
| 5 | −48.8351 | 1.3000 | 1.592824 | 68.63 |
| 6 | 37.3049 | 0.3426 | | |
| 7 | 25.9395 | 3.8767 | 1.882997 | 40.76 |
| 8 | −90.4402 | DD[8] | | |
| 9(stop) | ∞ | 1.3000 | | |
| 10 | 16.6667 | 0.8102 | 1.834000 | 37.16 |
| 11 | 8.4279 | 4.0002 | 1.595509 | 39.24 |
| 12 | 118.8185 | DD[12] | | |
| 13 | 35.7161 | 0.7100 | 1.804000 | 46.58 |
| 14 | 9.1398 | 3.5002 | 1.618000 | 63.33 |
| 15 | 97.6626 | DD[15] | | |
| *16 | 24.6962 | 5.5528 | 1.497103 | 81.56 |
| *17 | −15.3075 | 1.2998 | | |
| 18 | 49.8831 | 0.9098 | 1.816000 | 46.62 |
| 19 | 12.3856 | 7.8526 | 1.496999 | 81.54 |
| 20 | −13.3928 | 0.1998 | | |
| *21 | −12.5000 | 0.9998 | 1.696799 | 55.46 |
| *22 | −499.9123 | DD[22] | | |
| 23 | −79.7491 | 3.4998 | 1.696797 | 55.53 |
| 24 | −39.3959 | 5.0000 | | |
| 25 | ∞ | 2.8500 | 1.516798 | 64.20 |
| 26 | ∞ | 8.1488 | | |

TABLE 14

Example 4 Specs (the d-line)

| | Wide Angle End | Intermediate | Telephoto End |
|---|---|---|---|
| Zoom Ratios | 1.0 | 1.3 | 1.7 |
| f | 10.31 | 13.22 | 17.49 |

TABLE 14-continued

Example 4 Specs (the d-line)

|  | Wide Angle End | Intermediate | Telephoto End |
|---|---|---|---|
| Bf' (in air) | 15.03 | 15.03 | 15.03 |
| FNo. | 4.12 | 4.12 | 4.12 |
| 2ω[°] | 109.0 | 94.2 | 77.8 |

TABLE 15

Example 4 Distances Associated With Zooming

|  | Wide Angle End | Intermediate | Telephoto End |
|---|---|---|---|
| DD[8] | 18.33 | 9.33 | 1.58 |
| DD[12] | 5.84 | 5.57 | 5.52 |
| DD[15] | 2.47 | 2.53 | 2.47 |
| DD[22] | 2.00 | 6.14 | 12.20 |

TABLE 16

Example 4 Aspherical Surface Coefficients

| Surface Numbers | 3 | 4 | 16 |
|---|---|---|---|
| KA | 1.0000000E+00 | −4.4666424E−01 | 1.0000000E+00 |
| A3 | −1.3817779E−19 | 3.7470548E−19 | 1.4985194E−19 |
| A4 | 4.4410157E−04 | 6.1959628E−04 | −6.7428391E−05 |
| A5 | −6.1920288E−05 | −6.9016759E−05 | −9.2188980E−06 |
| A6 | 9.2176527E−07 | −1.0157498E−06 | −1.7400671E−06 |
| A7 | 3.4039567E−07 | 6.3342403E−07 | 7.6282519E−07 |
| A8 | −1.9428313E−08 | −2.9377138E−08 | −3.2464143E−08 |
| A9 | −7.6823472E−10 | −2.8302400E−09 | −1.0820187E−08 |
| A10 | 7.5852151E−11 | 2.5958657E−10 | 7.4500680E−10 |
| A11 | 7.8722766E−13 | 3.5359267E−12 | 4.5312369E−11 |
| A12 | −1.1850724E−13 | −6.2174234E−13 | −2.9810237E−12 |

| Surface Numbers | 17 | 21 | 22 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | −1.0065670E−04 | −4.6486987E−04 | −3.5481301E−04 |
| A5 | −1.5716077E−05 | 8.4542128E−05 | 8.6762538E−05 |
| A6 | 3.9221834E−06 | 4.3816463E−06 | 2.6510699E−06 |
| A7 | −2.9164884E−07 | −9.7804657E−07 | −1.2095651E−06 |
| A8 | −9.5812239E−09 | −4.7988906E−08 | 3.2456981E−09 |
| A9 | 5.8031148E−09 | 5.9074552E−09 | 7.3230369E−09 |
| A10 | −5.8054620E−10 | 4.2567871E−10 | −6.7832519E−11 |
| A11 | −2.6351579E−11 | −1.3137637E−11 | −1.6363737E−11 |
| A12 | 4.0629559E−12 | −1.3261204E−12 | 5.6302149E−14 |

Figure 6:
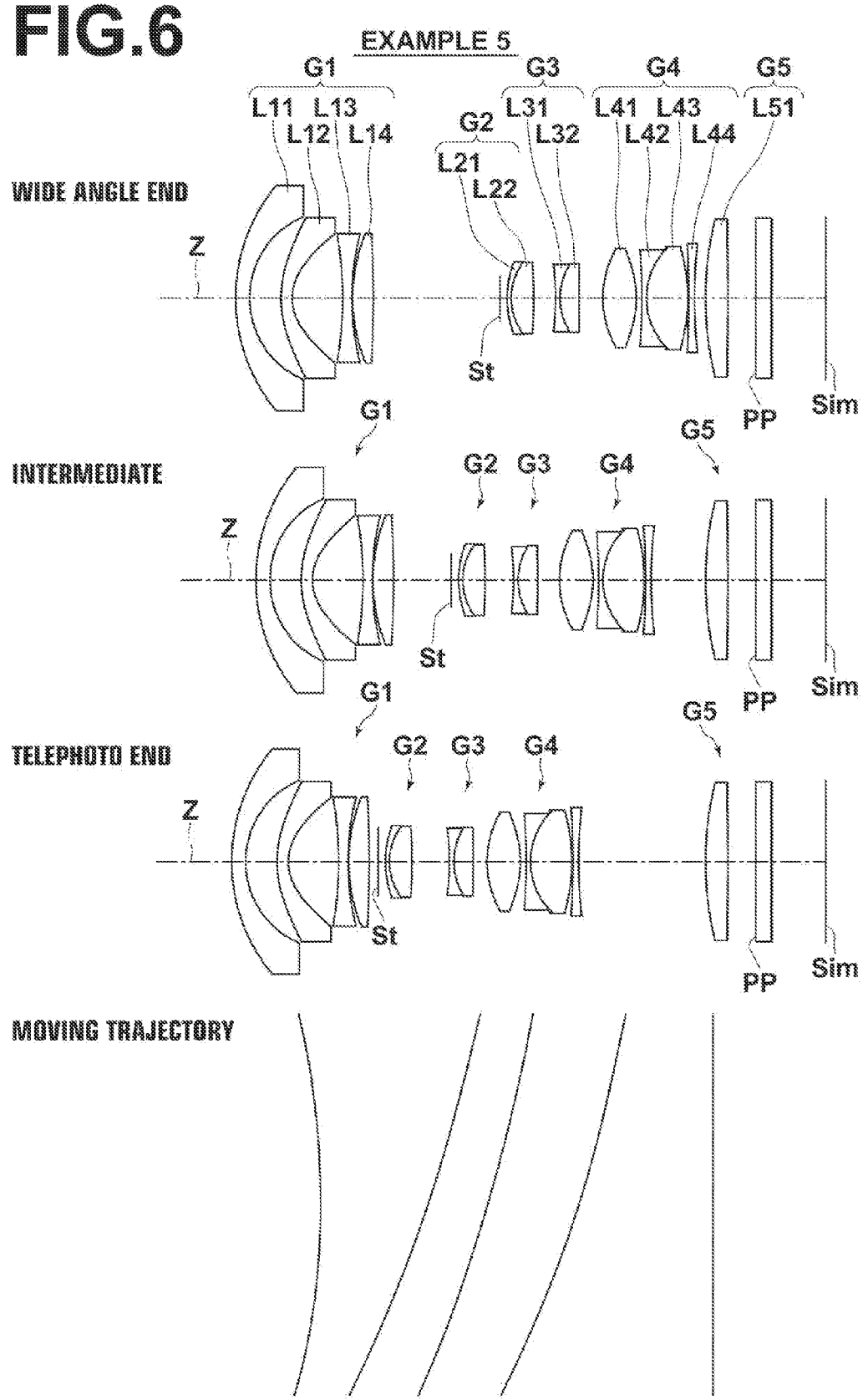
FIG. 6 is a collection of cross-sectional views of a zoom lens according to Example 5 of the present invention, illustrating the lens configuration thereof.

Next, a zoom lens of Example 5 will be described. FIG. 6 shows a collection of cross-sectional views of the zoom lens of Example 5, illustrating the lens configuration thereof. Moreover, basic lens data of the zoom lens of Example 5 are shown in Table 17, data related to specs thereof are shown in Table 18, data related to the distances between surfaces which move thereof are shown in Table 19, data related to aspherical surface coefficients are shown in Table 20, and the respective aberration diagrams are shown in A through L of FIG. 11.

TABLE 17

Example 5 Lens Data (n, ν is d-line)

| Si (Surface Numbers) | Ri (Radii of Cuvature) | di (Distances Between Surfaces) | ndj (Refractive Ratios) | νdj (Abbe Numbers) |
|---|---|---|---|---|
| 1 | 30.4439 | 2.4998 | 1.754999 | 52.32 |
| 2 | 15.3634 | 5.6105 |  |  |
| *3 | 18.5185 | 2.0002 | 1.772502 | 49.47 |
| *4 | 8.0863 | 9.0033 |  |  |
| 5 | −64.8476 | 1.6998 | 1.592824 | 68.63 |
| 6 | 45.4376 | 0.1001 |  |  |
| 7 | 29.0565 | 3.6769 | 1.910823 | 35.25 |
| 8 | −207.6190 | DD[8] |  |  |
| 9(stop) | ∞ | 1.3000 |  |  |
| 10 | 17.7525 | 0.7098 | 1.728250 | 28.46 |
| 11 | 10.1053 | 4.0002 | 1.603420 | 38.03 |
| 12 | −93.4035 | DD[12] |  |  |
| 13 | −47.5648 | 0.8102 | 1.816000 | 46.62 |
| 14 | 10.9869 | 3.4274 | 1.696797 | 55.53 |
| 15 | −549.1508 | DD[15] |  |  |
| *16 | 15.8897 | 6.0002 | 1.496999 | 81.54 |
| *17 | −16.6666 | 0.9998 |  |  |
| 18 | −110.1994 | 0.8098 | 1.816000 | 46.62 |
| 19 | 12.1951 | 7.3943 | 1.496999 | 81.54 |
| 20 | −30.9338 | 0.2002 |  |  |
| 21 | −129.7114 | 0.9998 | 1.834807 | 42.73 |
| 22 | 83.3359 | DD[22] |  |  |
| *23 | 58.3630 | 3.9540 | 1.688930 | 31.16 |
| *24 | −1995.5386 | 5.0000 |  |  |
| 25 | ∞ | 2.8500 | 1.516798 | 64.20 |
| 26 | ∞ | 9.6696 |  |  |

TABLE 18

Example 5 Specs (the d-line)

| | Wide Angle End | Intermediate | Telephoto End |
|---|---|---|---|
| Zoom Ratios | 1.0 | 1.5 | 2.2 |
| f | 10.31 | 14.95 | 22.73 |
| Bf' (in air) | 16.55 | 16.55 | 16.55 |
| FNo. | 4.12 | 4.12 | 4.12 |
| 2ω[°] | 108.8 | 86.8 | 63.8 |

TABLE 19

Example 5 Distances Associated With Zooming

| | Wide Angle End | Intermediate | Telephoto End |
|---|---|---|---|
| DD[8] | 22.66 | 10.36 | 1.61 |
| DD[12] | 3.94 | 5.10 | 6.71 |
| DD[15] | 4.19 | 3.95 | 2.48 |
| DD[22] | 2.00 | 9.76 | 22.71 |

TABLE 20

Example 5 Aspherical Surface Coefficients

| Surface Numbers | 3 | 4 | 16 |
|---|---|---|---|
| KA  | 1.0000000E+00 | 1.4300030E−01 | 1.0000000E+00 |
| A3  | 3.7267061E−19 | 5.6405173E−19 | 0.0000000E+00 |
| A4  | −8.8439065E−05 | −9.0283846E−05 | −5.2302460E−05 |
| A5  | 2.9435581E−05 | 5.4132171E−05 | 4.3344529E−06 |
| A6  | −4.7902377E−06 | −9.5933893E−06 | −1.3051240E−06 |
| A7  | 1.4340851E−07 | 2.1519239E−07 | 1.7405075E−07 |
| A8  | 2.6617462E−08 | 7.1316402E−08 | 8.9941596E−09 |
| A9  | −2.1212626E−09 | −5.2481346E−09 | −3.5102287E−09 |
| A10 | −8.3334927E−12 | −6.7341511E−11 | 1.2223924E−10 |
| A11 | 5.2707207E−12 | 1.7062328E−11 | 1.5403414E−11 |
| A12 | −1.3887748E−13 | −4.5312289E−13 | −8.6263730E−13 |

| Surface Numbers | 17 | 23 | 24 |
|---|---|---|---|
| KA  | 1.0000000E+00 | 1.0000000E+00 | 1.0000000E+00 |
| A3  | 0.0000000E+00 | 1.0323214E−19 | 0.0000000E+00 |
| A4  | 7.2862567E−05 | −4.4616454E−05 | −4.3119222E−05 |
| A5  | 4.9750359E−06 | 9.2800219E−06 | 5.0144387E−06 |
| A6  | −1.4301283E−06 | −4.7170231E−07 | 4.2428624E−07 |
| A7  | 1.2784534E−07 | −5.3111746E−08 | −1.1101060E−07 |
| A8  | 1.1879060E−08 | 5.8952090E−09 | 2.8941441E−09 |
| A9  | −2.4062998E−09 | 9.8854431E−11 | 6.3088965E−10 |
| A10 | 1.6247409E−11 | −2.0960690E−11 | −3.1247406E−11 |
| A11 | 1.1150065E−11 | −1.7490047E−14 | −1.1282365E−12 |
| A12 | −2.9923758E−13 | 2.2714404E−14 | 6.4984415E−14 |

Values corresponding to conditional formulas (1) through (8) are shown in Table 21 for each of the zoom lenses of Examples 1 through 5. Note that the d-line is the reference wavelength in all the Examples, and the values shown in Table 21 are based on this reference wavelength.

TABLE 21

| Formula Numbers | Conditional Formulas | Example 1 | Example 2 | Example 3 | Example 4 | Example 5 |
|---|---|---|---|---|---|---|
| (1) | 0.15 < |f1|/f2 < 1.0 | 0.81 | 0.79 | 0.70 | 0.35 | 0.68 |
| (2) | 0.1 < f4/f5 < 1.1 | 0.75 | 0.60 | 0.60 | 0.28 | 0.40 |
| (3) | 0.2 < f41/f4 < 1 | 0.41 | 0.55 | 0.44 | 0.66 | 0.53 |
| (4) | 30 < vdp − vdn < 45 | 34.96 | 39.32 | 34.92 | 34.92 | 34.92 |
| (5) | 0.1 < D45t/f4 < 1.1 | 0.46 | 0.74 | 0.55 | 0.41 | 0.69 |
| (6) | 0.05 < bfw/f5 < 0.5 | 0.23 | 0.26 | 0.21 | 0.14 | 0.20 |
| (7) | −3.0 < (r51f + r51r)/(r51f − r51r) < 7.5 | 0.79 | 0.73 | 0.54 | 2.95 | −0.94 |
| (8) | 50 < ω | 56.00 | 55.00 | 54.60 | 54.50 | 54.40 |

It can be understood from the data shown above that all of the zoom lenses of Examples 1 through 5 satisfy conditional formulas (1) through (7) and are compact zoom lenses having short total lengths, in which the full angles of view are approximately 110 degrees, which are wide angles of view, and various aberrations are satisfactorily corrected.

Next, an imaging apparatus according to an embodiment of the present invention will be described. FIG. 12 shows illustrates the outer appearance of a mirrorless interchangeable lens camera using the zoom lens of the embodiment of the present invention, illustrating one example of a configuration thereof as an example of an imaging device according to the embodiment of the present invention.

Figure 12A:
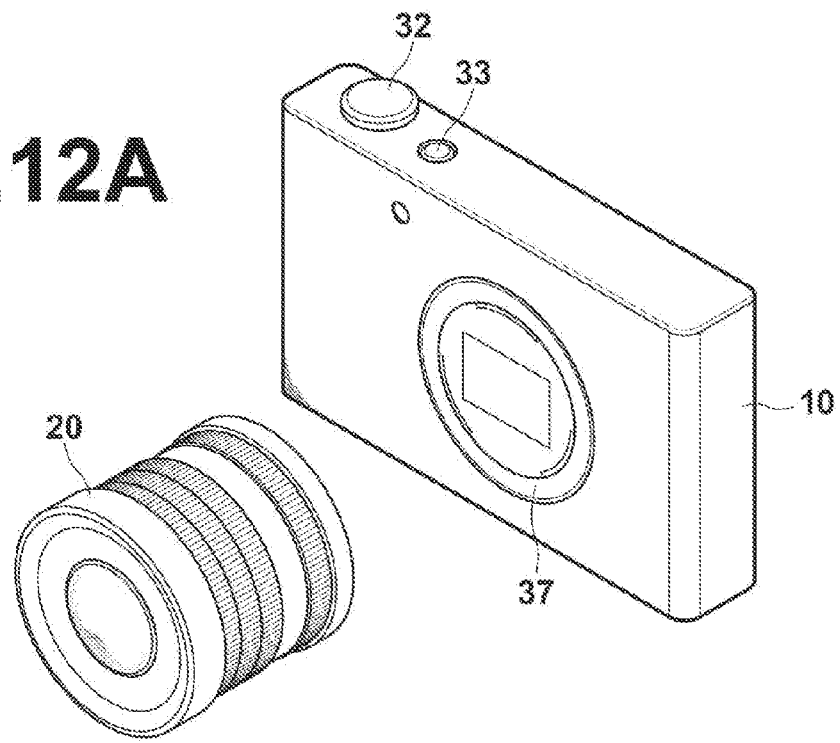
FIG. 12A is a schematic configuration diagram of an imaging apparatus according to an embodiment of the present invention.
Figure 12B:
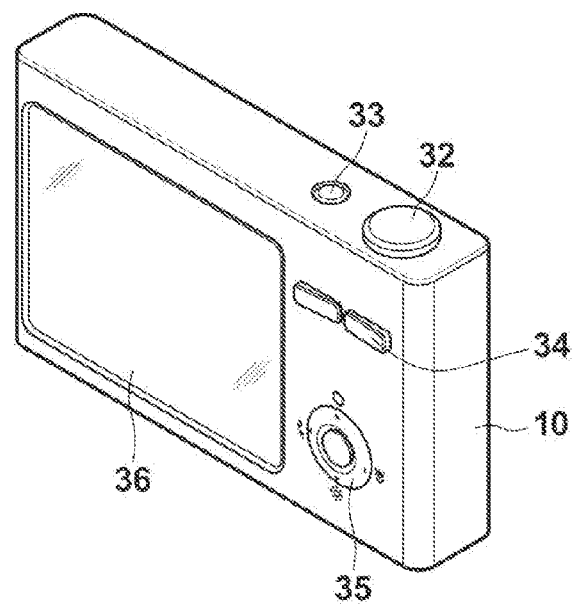
FIG. 12B is a schematic configuration diagram of an imaging apparatus according to an embodiment of the present invention.

Particularly, FIG. 12A shows the external appearance of this camera as viewed from the front, and FIG. 12B shows the external appearance of this camera as viewed from the back. This camera includes a camera body 10, and a shutter release button 32 and a power button 33 are provided on the upper surface side of the camera body 10. A display section 36 and operation sections 34 and 35 are provided on the back side of the camera body 10. The display section 36 is a section for displaying photographed images.

A photographing aperture, into which light from a photographing object enters, is provided in the center portion of the front side of the camera body 10, and a mount 37 is provided at a position corresponding to the photographing aperture. An interchangeable lens 20 is designed to be mounted on the camera body 10 by the mount 37. The interchangeable lens 20 is a lens which houses lens members within a barrel. An imaging element, such as a CCD, or the like which outputs image signals corresponding to subject images formed by the interchangeable lens 20, a signal processing circuit which processes the image signals output from the imaging element and generates images, a recording medium for recording the generated images, and the like are provided within the camera body 10. In this camera, the shutter release button 32 is pressed and operated so that a still image for one frame is photographed and the image data obtained by the photographing operation is recorded in the recording medium (not shown) within the camera body 10.

If a zoom lens according to the present embodiments is applied as the interchangeable lens 20 in such a mirrorless interchangeable lens camera, the camera can be miniaturized as a whole, and a high quality video image, in which a wider angle of view is achieved and various aberrations are satisfactorily corrected, can be obtained.

The present invention has been described with reference to the embodiments and Examples. The zoom lens of the present invention is not limited to the Examples described above, and various modifications are possible. For example, values, such as the radius of curvature, the distances between surfaces, the refractive indices, and the Abbe numbers of each lens are not limited to the values shown in the Numerical Examples above, but may be other values.

What is claimed is:

1. A zoom lens substantially consisting of a first lens group having a negative refractive power, a second lens group having a positive refractive power, a third lens group having a negative refractive power, a fourth lens group having a positive refractive power, and a fifth lens group having a positive refractive power, in this order from the object side; wherein
the first lens group through the fourth lens group move along the optical axis while changing magnification from the wide angle end to the telephoto end so as to change the distances among one another such that the distance between the first lens group and the second lens group is reduced and the distance between the second lens group and the third lens group is increased;
the fifth lens group is fixed with respect to an image surface while changing magnification; and
conditional formulas (1) and (2) below are satisfied:

$$0.15 < |f1|/f2 < 1.00 \quad (1)$$

$$0.1 < f4/f5 < 1.1 \quad (2), \text{where}$$

f1: the focal length of the first lens group,
f2: the focal length of the second lens group,
f4: the focal length of the fourth lens group, and
f5: the focal length of the fifth lens group.

2. The zoom lens of claim 1 comprising a stop between the most-image-side surface of the first lens group and the most-object-side surface of the third lens group; wherein
the stop moves integrally with the second lens group while changing magnification.

3. The zoom lens of claim 1, wherein the most-object-side lens of the fourth lens group substantially consists of a single lens having a positive refractive power: and
conditional formula (3) below is satisfied:

$$0.2 < f41/f4 < 1.0 \quad (3), \text{where}$$

f41: the focal length of the most-object-side single lens of the fourth lens group.

4. The zoom lens of claim 1, wherein the most-object-side lens of the fourth lens group substantially consists of a single lens having a positive refractive power; and
focusing is performed by moving the single lens along the direction of the optical axis.

5. The zoom lens of claim 1, wherein the fourth lens group includes a cemented lens formed by two lenses having refractive powers having different signs; and
conditional formula (4) below is satisfied:

$$30 < vdp - vdn < 45 \quad (4), \text{where}$$

vdp: the Abbe number with respect to the d-line (wavelength: 587.6 nm) of at least one positive lens which constitutes the cemented lens within the fourth lens group, and
vdn: the Abbe number with respect to the d-line (wavelength: 587.6 nm) of at least one negative lens which constitutes the cemented lens within the fourth lens group.

6. The zoom lens of claim 1, wherein the fourth lens group substantially consists of a biconvex lens having a positive refractive power and a cemented lens formed by cementing a lens having a negative refractive power with a concave surface toward the image side, of which the absolute value of the radius of curvature is smaller than that of the object-side surface, a lens having a positive refractive power and a lens having a negative refractive power together in this order from the object side.

7. The zoom lens of claim 1, wherein the fourth lens group substantially consists of a biconvex lens having a positive refractive power, a cemented lens formed by cementing a lens having a negative refractive power with a concave surface toward the image side, of which the absolute value of the radius of curvature is smaller than that of the object-side surface and a lens having a positive refractive power together, and a lens having a negative refractive power in this order from the object side.

8. The zoom lens of claim 1, wherein conditional formula (5) below is satisfied:

$$0.1 < D45t/f4 < 1.1 \quad (5), \text{where}$$

D45t: the distance between the most-image-side-surface apex of the fourth lens group at the telephoto and the most-object-side-surface apex of the fifth lens group at the telephoto end.

9. The zoom lens of claim 1, wherein conditional formula (6) below is satisfied:

$$0.05 < bfw/f5 < 0.5 \quad (6),\text{ where}$$

bfw: the back focus length at the wide angle end.

10. The zoom lens of claim 1, wherein the fifth lens group substantially consists of a single lens having a positive refractive power; and
conditional formula (7) below is satisfied:

$$-3.0 < (r51f + r51r)/(r51f - r51r) < 7.5 \quad (7),\text{ where}$$

r51f: the radius of curvature of the object-side surface of the single lens which constitutes the fifth lens group, and
r51r: the radius of curvature of the image-side surface of the single lens which constitutes the fifth lens group.

11. The zoom lens of claim 1, wherein conditional formula (8) below is satisfied:

$$50 < \omega \quad (8),\text{ where}$$

ω: a half angle of view (degree) at the wide angle end.

12. The zoom lens of claim 1, wherein conditional formula (1-1) below is satisfied:

$$0.25 < |f1|/f2 < 0.90 \quad (1\text{-}1).$$

13. The zoom lens of claim 1, wherein conditional formula (2-1) below is satisfied:

$$0.15 < f4/f5 < 0.9 \quad (2\text{-}1).$$

14. The zoom lens of claim 1, wherein the most-object-side lens of the fourth lens group substantially consists of a single lens having a positive refractive power; and
conditional formula (3-1) below is satisfied:

$$0.3 < f41/f4 < 0.8 \quad (3\text{-}1),\text{ where}$$

f41: the focal length of the most-object-side single lens of the fourth lens group.

15. The zoom lens of claim 1, wherein the fourth lens group includes a cemented lens formed by two lenses having refractive powers having different signs; and
conditional formula (4-1) below is satisfied:

$$33 < vdp - vdn < 42 \quad (4\text{-}1),\text{ where}$$

vdp: the Abbe number with respect to the d-line (wavelength: 587.6 nm) of at least one positive lens which constitutes the cemented lens within the fourth lens group, and
vdn: the Abbe number with respect to the d-line (wavelength: 587.6 nm) of at least one negative lens which constitutes the cemented lens within the fourth lens group.

16. The zoom lens of claim 1, wherein conditional formula (5-1) below is satisfied:

$$0.3 < D45t/f4 < 0.9 \quad (5\text{-}1),\text{ where}$$

D45t: the distance between the most-image-side-surface apex of the fourth lens group at the telephoto and the most-object-side-surface apex of the fifth lens group at the telephoto end.

17. The zoom lens of claim 1, wherein conditional formula (6-1) below is satisfied:

$$0.10 < bfw/f5 < 0.3 \quad (6\text{-}1),\text{ where}$$

bfw: the back focus length at the wide angle end.

18. The zoom lens of claim 1, wherein the fifth lens group to substantially consist of a single lens having a positive refractive power; and
conditional formula (7-1) below is satisfied:

$$-1.5 < (r51f + r51r)/(r51f - r51r) < 5.0 \quad (7\text{-}1),\text{ where}$$

r51f: the radius of curvature of the object-side surface of the single lens which constitutes the fifth lens group, and
r51r: the radius of curvature of the image-side surface of the single lens which constitutes the fifth lens group.

19. An imaging apparatus comprising:
the zoom lens of claim 1.

* * * * *